United States Patent
Ishida et al.

(10) Patent No.: US 6,232,978 B1
(45) Date of Patent: *May 15, 2001

(54) IMAGE PROCESSING APPARATUS, AND METHOD OF CONTROLLING SAME, USING A COMBINATION OF ENLARGEMENT AND FIXED RATIO REDUCTION PROCESSING

(75) Inventors: Yoshihiro Ishida; Shinichiro Koga, both of Kawasaki; Nobuyuki Shigeeda, Yokohama; Takeshi Kawazome, Utsunomiya, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/543,626

(22) Filed: Oct. 16, 1995

(30) Foreign Application Priority Data

Oct. 17, 1994 (JP) .................................... 6-250868

(51) Int. Cl.[7] .................................... G06T 3/00
(52) U.S. Cl. .................................... 345/427
(58) Field of Search .................... 395/133, 139, 395/167–172; 345/427

(56) References Cited

U.S. PATENT DOCUMENTS

| 5,398,311 | * | 3/1995 | Seto | 395/139 |
| 5,600,347 | * | 2/1997 | Thompson et al. | 345/427 |

FOREIGN PATENT DOCUMENTS

| 3-34677 | 2/1991 | (JP) . |
| 4-157578 | 5/1992 | (JP) . |
| 5-20467 | 1/1993 | (JP) . |
| 5-174140 | 7/1993 | (JP) . |
| 6-12490 | 1/1994 | (JP) . |

OTHER PUBLICATIONS

Kohei Arai, et al., "Examination of Facsimile Line Density Conversion", Journal of Society of Image Electronics, vol. 7, No., 1, pp. 11–18 (1978) (with English translation).

* cited by examiner

Primary Examiner—Almis R. Jankus
(74) Attorney, Agent, or Firm—Fitzpatrick, Cella, Harper & Scinto

(57) ABSTRACT

Contour vectors are extracted by an outline extraction unit from a binary image acquired by a binary image acquisition unit. An outline smoothing/zooming unit smoothes and zooms the image expressed by the contour vectors. The zoom ratio at this time is controlled by a zoom controller in such a manner that a zoom ratio obtained by combining this zoom ratio with the zoom ratio of a second zooming unit will become a desired zoom ratio. The smoothed and zoomed image data is converted to a binary image by a binary image reproducing unit. This binary image is zoomed by the second zooming unit. The zoom ratio here preferably is selected in such a manner that the zoom ratio of the smoothing zoom unit becomes unity or greater. As a result, zooming of image data expressed by vectors is no longer limited to enlargement, images can be reduced in size while still remaining faithful to the original image, and it is unnecessary to process extra data.

29 Claims, 22 Drawing Sheets

○ HORIZONTAL LINE
  HORIZONTAL VECTOR

△ VERTICAL LINE
  VERTICAL VECTOR

FIG. 18
(PRIOR ART)

| Section | Entry | Description |
|---|---|---|
| NUMBER OF LOOPS IN IMAGE | N | NUMBER OF CLOSED LOOPS |
| TABLE OF NUMBER OF CONTOUR POINTS IN EACH LOOP | $L_1$ | NUMBER OF CONTOUR POINTS IN FIRST LOOP |
| | $L_2$ | NUMBER OF CONTOUR POINTS IN SECOND LOOP |
| | ⋮ | ⋮ |
| | $L_{i-1}$ | NUMBER OF CONTOUR POINTS IN (i−1)th LOOP |
| | $L_i$ | NUMBER OF CONTOUR POINTS IN i-th LOOP |
| | $L_{i+1}$ | NUMBER OF CONTOUR POINTS IN (i+1)th LOOP |
| | ⋮ | ⋮ |
| | $L_{N-1}$ | NUMBER OF CONTOUR POINTS IN (N−1)th LOOP |
| | $L_N$ | NUMBER OF CONTOUR POINTS IN N-th LOOP |
| TABLE OF COORDINATES OF EACH CONTOUR POINT IN FIRST LOOP | $x_{11}$, $y_{11}$ | COORDINATES OF FIRST CONTOUR POINT IN FIRST LOOP |
| | $x_{12}$, $y_{12}$ | COORDINATES OF SECOND CONTOUR POINT IN FIRST LOOP |
| | ⋮ | ⋮ |
| | $x_{1j-1}$, $y_{1j-1}$ | COORDINATES OF (j−1)th CONTOUR POINT IN FIRST LOOP |
| | $x_{1j}$, $y_{1j}$ | COORDINATES OF j-th CONTOUR POINT IN FIRST LOOP |
| | $x_{1j+1}$, $y_{1j+1}$ | COORDINATES OF (j+1)th CONTOUR POINT IN FIRST LOOP |
| | ⋮ | ⋮ |
| | $x_{1L_1-1}$, $y_{1L_1-1}$ | COORDINATES OF ($L_1$−1)th CONTOUR POINT IN FIRST LOOP |
| | $x_{1L_1}$, $y_{1L_1}$ | COORDINATES OF $L_1$-th CONTOUR POINT IN FIRST LOOP |
| TABLE OF COORDINATES OF EACH CONTOUR POINT IN SECOND LOOP | $x_{21}$, $y_{21}$ | COORDINATES OF FIRST CONTOUR POINT IN SECOND LOOP |
| | ⋮ | ⋮ |
| | $x_{2L_2}$, $y_{2L_2}$ | COORDINATES OF $L_2$-th CONTOUR POINT IN SECOND LOOP |
| | ⋮ | ⋮ |
| TABLE OF COORDINATES OF EACH CONTOUR POINT IN N-th LOOP | $x_{N1}$, $y_{N1}$ | COORDINATES OF FIRST CONTOUR POINT IN N-th LOOP |
| | ⋮ | ⋮ |
| | $x_{NL_N}$, $y_{NL_N}$ | COORDINATES OF $L_N$-th CONTOUR POINT IN N-th LOOP |

TABLE OF CONTOUR-POINT COORDINATES

IMAGE PROCESSING APPARATUS, AND METHOD OF CONTROLLING SAME, USING A COMBINATION OF ENLARGEMENT AND FIXED RATIO REDUCTION PROCESSING

BACKGROUND OF THE INVENTION

1. Field of the Invention

This invention relates to magnification or "zoom" processing, particularly reduction processing, of a digital binary image, and to an image processing apparatus and method for obtaining a high-quality zoomed image using contour information.

2. Description of the Related Art

The applicant has already filed applications for such an apparatus disclosed publicly as Japanese Patent Application Laid-Open (KOKAI) No. 5-174140 (prior art ①) and Japanese Patent Application Laid-Open (KOKAI) No. 6-12490 (prior art ②).

According to each of these applications, a binary image per se is not varied in power, or zoomed, when it is desired to output the binary image upon changing its magnification. Rather, contour information of the binary image is extracted and a zoomed image is produced based upon the contour information extracted, whereby it is possible to obtain a high-quality image.

More specifically, Japanese Patent Application Laid-Open No. 5-174140 (prior art ①) teaches to extract an outline vector from a binary image, create a smoothly zoomed outline vector at a desired rate of magnification (arbitrary) in the state of the extracted outline vector representation, and reproduce a binary image from the smoothly zoomed outline vector. In this manner it is attempted to obtain a high-quality digital binary image varied in power at the desired rate of magnification (arbitrary).

The principal elements of this arrangement will be described in general terms. FIG. 9 is a diagram which best illustrates the features of Japanese Patent Application Laid-Open No. 5-174140.

As shown in FIG. 9, a binary image acquisition unit 1 acquires a digital binary image that is to undergo zoom processing and outputs the binary image in a raster-scan format. An outline extraction unit 2 extracts a coarse contour vector (an outline vector prior to smoothing and zoom processing) from the binary image having the raster-scan format. An outline smoothing/zooming unit 3 smoothes and applies zoom processing to the coarse contour vector data in the form of vector data. A binary image reproduction unit 4 reproduces the binary image data in the raster-scan format from the outline vector data. A binary image output unit 5 displays the binary image data in the raster-scan format, produces a hard copy of the data or outputs the data to a communication line or the like.

The binary image acquisition unit 1 is a well-known raster-scanning type binary image output unit which reads the image of an original as a binary image and outputs the image in a raster-scan format. The outline extraction unit 2 is the apparatus described in the specification of Japanese Patent Application Laid-Open (KOKAI) No. 4-157578 already proposed by the applicant.

FIG. 10 illustrates the scanning of the raster-scan binary image data outputted by the binary image acquisition unit 1 as well as the scanning of the raster-scan binary image data which enters the outline extraction unit 2. The raster-scan binary image data outputted by the binary image acquisition unit 1 enters the outline extraction unit 2. In FIG. 10, numeral 101 denotes a pixel in the binary image undergoing raster scanning, and numeral 102 represents a nine-pixel area, namely the pixel 101 and the eight pixels neighboring it. The apparatus constituting the outline extraction unit described in the specification of Japanese Patent Application Laid-Open No. 4-157578 mentioned above shifts a pixel of interest in the order in which raster scanning is performed and, with regard to each pixel of interest, detects contour edge vectors (horizontal or vertical vectors) between the pixel of interest and the pixels neighboring the pixel of interest. If a contour edge vector exists, the apparatus extracts the coordinates of the starting point of this edge vector as well as the data indicating the direction of the vector and extracts the coarse contour vector while updating the connection relationship between edge vectors.

FIG. 11 illustrates an example of extraction of contour edge vectors between a pixel of interest and the pixels neighboring it. In FIG. 11, the "Δ" mark indicates the starting point of a vertical vector and the "o" mark the starting point of a horizontal vector.

FIG. 12 depicts an example of coarse-contour vector loops extracted by the outline extraction means described above. Here each box delimited by the grid indicates a pixel position in an input image; blank boxes signify white pixels and the shaded circle marks signify black pixels. As in FIG. 11, the "Δ" mark indicates the starting point of a vertical vector and the "o" mark the starting point of a horizontal vector.

It will be appreciated from the example of FIG. 12 that the outline extraction unit 2 extracts areas of contiguous black pixels as coarse-contour vector loops in which a horizontal vector and a vertical vector are always interconnected in alternating fashion. It is so arranged that the direction in which extraction processing advances is such that the side to the right of the direction of advance is the area of the black pixels. Further, the starting point of a coarse-contour vector is extracted as a position intermediate each pixel of the input image. In other words, if the present position of each pixel is represented by integers (x,y), then the starting point of an extracted vector is a value obtained by adding 0.5 to or subtracting 0.5 from each of these coordinates. More specifically, a line segment having a width of one pixel in an original image also is extracted as a coarse contour loop having a significant width. A group of coarse-contour vector loops thus extracted is outputted by the outline extraction unit 2 of FIG. 9 in a data format of the kind shown in FIG. 13. That is, the data comprises the total number N of contours extracted from the image and a group of coarse-contour loop data from a first contour loop to an N-th contour loop. Each item of coarse-contour loop data is composed of the total number of starting points of contour edge vectors present in a coarse-contour loop (this number can be thought of as the total number of contour edge vectors), and a column of values of starting-point coordinates (x- and y-coordinate values) of each contour edge vector in the order in which the edge vectors construct the loop (the starting point of a horizontal vector and the starting point of a vertical vector are arranged in alternating fashion).

Next, the outline smoothing/zoom unit 3 shown in FIG. 9 accepts the coarse-contour vector data (see FIG. 13) from the outline extraction unit 2 as an input and executes smoothing and zoom processing, which is for zooming to a desired magnification, in the form of the outline vector data (coordinate values). FIG. 14 illustrates the construction of the outline smoothing/zoom unit 3 in greater detail. As shown in FIG. 14, the outline smoothing/zoom unit 3 includes a magnification setting device 310 for zooming, and a first smoothing/zooming device 320. The first smoothing/zooming device 320 subjects the entered coarse contour data to smoothing and zoom processing at the magnification set by the magnification setting device 310. The results of processing are smoothed in a second smoothing device 330, whereby a final output is obtained.

The magnification setting device 310, which provides information indicating what the magnification of an input image size should be independently in the main-scan (horizontal) direction and sub-scan (vertical) direction, may deliver values, which have been set in advance by a DIP switch or dial switch, to the first smoothing/zoom device 320, or may have a configuration which supplies the values from some external unit via an interface.

The first smoothing/zoom device 320 obtains the magnification information from the magnification setting device 310 and applies smoothing and zoom processing.

FIG. 15 illustrates an example of hardware for implementing the outline smoothing/zoom unit 3. Shown in FIG. 15 are a CPU 71, a disk unit 72, a disk I/O (interface) 73, a ROM 74 storing the operational processing procedure of the CPU 71, an I/O port 75, a RAM (random-access memory) 76 and a bus 77 interconnecting these blocks.

The output of the outline extraction unit 2 in FIG. 9 is stored as a file (coarse-contour vector data) in the disk 72 in the form shown in FIG. 13. The CPU 71 operates according to the procedure shown in FIG. 16 and executes outline smoothing/zoom processing.

First, as shown at step S1 in FIG. 16, the CPU 71 reads out the coarse contour data, which has been stored on the disk device 72, via the disk I/O 73 and reads this data into a working area (not shown) in the RAM 76. The CPU 71 then executes first smoothing and zoom processing at step S2.

The first smoothing processing is performed in units of individual closed loops of coarse contour data. The CPU 71 successively targets each contour edge (a horizontal or vertical vector) of each item of coarse contour data, divides the data into a pattern depending upon a combination of lengths and directions of interconnected edge vectors of up to three vectors before and three after each targeted contour edge vector (i.e., three vectors before the targeted edge, the vector of the targeted edge itself and three vectors after the targeted edge, for a total of seven edge vectors), and, with regard to each particular case, defines contour points that have undergone first smoothing, namely contour points that are the result of first smoothing with respect to the targeted edge. The CPU 71 outputs coordinate values of the contour points and additional information (hereinafter referred to as "corner-point information") indicating whether a contour point is a corner point. The corner point mentioned here refers to a point situated at a meaningful corner. Corner points at jaggies caused by noise or the like and corner points resulting from notches or the like are excluded. A contour point that has been subjected to first smoothing and judged to be a corner point is treated as a point not to be smoothed, namely as a fixed point at this position, by subsequent second smoothing. A contour point that has been subjected to first smoothing and judged not to be a corner point (hereinafter referred to a "non-corner point") undergoes further smoothing by subsequent second smoothing.

FIG. 17 illustrates the foregoing. More specifically, FIG. 17 shows a targeted coarse-contour edge vector $D_i$, three edge vectors $D_{i-1}$, $D_{i-2}$, $D_{i-3}$ before the targeted coarse-contour edge vector, and three vectors $D_{i+1}$, $D_{i+2}$, $D_{i+3}$ after the targeted coarse-contour edge vector, as well as a contour point, which has been subjected to first smoothing, defined with respect to the targeted coarse-contour edge vector $D_i$.

The processing involved in first smoothing is as described above. The data that has undergone first smoothing is stored successively in a prescribed area of the RAM 76. When the processing of step S2 in FIG. 16 is concluded, the CPU 72 executes the second smoothing processing at step S3.

Second smoothing processing involves entering the data that has undergone first smoothing and then processing this data. More specifically, the number of closed loops, the number of contour points per closed loop, a column of coordinate data of contour points that have undergone first smoothing per closed loop, and a column of additional information of contour points that have undergone first smoothing per closed loop are entered and contour-point data that has undergone second smoothing is outputted.

The contour data that has undergone second smoothing is composed of the number of closed loops, a table of the number of contour points per closed loop, and a column of coordinate data of contour loops that have undergone second smoothing per closed loop, as illustrated in FIG. 18.

The essentials of second smoothing will be described with reference to FIG. 19. Second smoothing is executed in units of individual contour loops, as in the manner of first smoothing, and processing proceeds from one contour point to the next within each contour loop.

In a case where a contour point of interest is a corner point, the coordinates per se of the entered contour point are adopted as the contour-point coordinate data, after second smoothing, of this targeted contour point. In other words, the aforesaid coordinate values are not changed in any way.

In a case where the targeted contour point is a non-corner point, coordinate values obtained by a weighted mean of contour-point coordinates before and after and coordinates of the targeted contour point are adopted as the contour-point coordinate values, after second smoothing, of the targeted contour point. That is, if we let $P_i$ $(x_i,y_i)$ represent a targeted input contour point that is a non-corner point, let $P_{i-1}$ $(x_{i-1},y_{i-1})$ represent the contour point immediately preceding the point $P_i$ on the input contour loop, let $P_{i+1}$ $(x_{i+1},y_{i+1})$ represent the contour point immediately following the point $P_i$, and let $Q_i$ $(x'_i,y'_i)$ represent the contour point, after second smoothing, of the targeted input contour point $P_i$, then the coordinates of the contour point after second smoothing are calculated as follows:

$$\left. \begin{aligned} x'_i &= k_{i-1} \cdot x_{i-1} + k_i \cdot x_i + k_{i+1} \cdot x_{i+1} \\ y'_i &= k_{i-1} \cdot y_{i-1} + k_i \cdot y_i + k_{i+1} \cdot y_{i+1} \end{aligned} \right\} \quad (1)$$

where $k_{i-1}=k_{i+1}=\frac{1}{4}$, $k_i=\frac{1}{2}$.

In FIG. 19, the points $P_0$, $P_1$, $P_2$, $P_3$ and $P_4$ are part of a sequence of entered consecutive contour points that have undergone first smoothing, in which the points $P_0$ and $P_4$ are corner points and points $P_1$, $P_2$ and $P_3$ are non-corner points. The results of processing at this time are points $Q_1$, $Q_2$, $Q_3$, $Q_4$. Since the points $P_0$ and $P_4$ are corner points, the coordinate values thereof become the coordinate values of points $Q_0$ and $Q_4$, respectively, without change. The point $Q_1$ has coordinates calculated from points $P_0$, $P_1$, $P_2$ in accordance with the above-mentioned equation. Similarly, point $Q_2$ has coordinates calculated from points $P_1$, $P_2$, $P_3$ and point $Q_3$ has coordinates calculated from points $P_2$, $P_3$, $P_4$ in accordance with the above-mentioned equation.

Such processing is implemented by the CPU 71 as second smoothing of contour data, which has undergone first smoothing, in the prescribed area of RAM 76. The CPU 71 executes this processing loop by loop in order from the first loop to the second, the second loop to the third and so forth, and terminates second smoothing in response to conclusion of this processing with regard to all loops. In the processing of each loop, the CPU 71 executes processing in order from the first point to the second, the second point to the third and so forth. When the processing indicated by Equation (1) is finished for all contour points on the particular loop, the processing of this loop is terminated and processing proceeds to the next loop.

It should be noted that if L-number of contour points reside on one loop, the point preceding the first point is the L-th point and the point following the L-th point is the first point. In the second smoothing set forth above, the contour-point data generated has the same total number of loops as the input contour data that has undergone first smoothing and the same number of contour points in each loop. The CPU 72 outputs the aforementioned results to a separate area of the RAM 76 or to the disk device 72 in the form shown in FIG. 18, thereby concluding the processing for second smoothing (step S3).

Next, the CPU 71 proceeds to step S4, where it transfers the resulting from second smoothing to the binary image reproduction unit 4 via the I/O 75, thus ending the series of processing steps shown in FIG. 16.

The binary image reproduction unit 4 can have the construction of a device described in the specification of Japanese patent application Laid-Open No. 5-20467 already filed by the applicant. On the basis of the contour data subjected to second smoothing and transferred via the I/O, this device is capable of outputting, by raster scanning, a binary image produced by filling in a region demarcated by vectors expressed by the contour data. As described in the specification, this proposed device is realized using binary image output means such as a video printer.

The proposal described in the specification of Japanese Patent Application Laid-Open No. 6-12490 is a further improvement upon the art disclosed in Japanese Patent Application Laid-Open No. 5-174140 and is so adapted that a variable-power image having a low magnification will not become too bloated. More specifically, with the outline extraction unit of Japanese Patent Application Laid-Open No. 5-174140, the boundary exactly midway between a white pixel and a black pixel in an original image is made the object of vector extraction. By contrast, with the art of Japanese Patent Application Laid-Open No. 6-12490, extraction is performed more toward the side of the black pixel (the area of the black pixel narrowed in comparison with the area of the white pixel) and outline smoothing conforming to this extraction is performed.

Meanwhile, methods of reducing the size of an image include the SPC (Selective Processing Conversion) method, the projection method and the PRES method. With the SPC method, slender lines vanish and curves are broken at irregular portions after reduction is performed. The result is a pronounced decline in image quality. Though the projection method provides an improvement in image quality, there is still room for further improvement. The PRES method is a reduction method which applies a fixed magnification of $$\frac{1}{2}x$$

both horizontally and vertically, or $$\frac{1}{4}x$$

in terms of area ratio. Though a reduced image having excellent image quality is obtained at such magnification, other magnifications cannot be accommodated. The details of the SPC method and projection method are described in "One Study of Facsimile Line-Density Conversion" (Arai, Yasuda), *Gazo Denshi Gakkaishi* (*The Journal of the Institute of Image Electronics Engineers of Japan*), Vol. 7, No. 1 (1978), pp. 11~18, by way of example. Further, with regard to the PRES method, the details are described in Japanese patent application Laid-Open No. 3-34677.

With the zoom processing for the purpose of enlargement at a comparatively high magnification of 2× or more in prior art ①, good results are obtain in terms of high image quality. On the hand, however, the two difficulties mentioned below arise when this art is applied to enlargement at a comparatively low magnification of 1× to 2× or to zooming for the purpose of size reduction.

First, as described above in connection with FIGS. 11 and 12, a smoothing operation and a zoom operation for enlargement or reduction at a low magnification are performed to define the starting points (contour points) of contour edge vectors (horizontal or vertical vectors) in individual units of the input pixel grid. Frequently, cases arise in which, in the smoothed and zoomed contour points (starting points of horizontal, vertical and diagonal vectors) obtained as a result, the coordinates of a plurality of contour points that are close together before zooming become coordinates at which corresponding positions on the grid of the digital image come to occupy exactly the same position after zooming. In other words, when the pixel grid of a digital image is expressed in a coordinate system based upon whole numbers, the values obtained by executing the smoothing operation (such as calculation of the mid-points of vector edges) and the zoom operation (multiplication by a desired magnification generally expressed by decimals) based upon the coordinates of each contour point extracted from the original image generally are not whole numbers but are numbers involving fractions. However, in order to achieve correspondence to the pixel grid of a digital binary image, it is required that the decimal portions of these numbers be rounded off to obtain integers. When such a conversion to whole numbers is made (as by rounding or discarding fractions), a group of contour points at which coordinate values are whole-number converted to exactly the same coordinate values are produced. A contour vector having starting and end point coordinates that are the same comes to exist on the same contour vector loop. In a set of a plurality of contour vectors (horizontal, vertical or diagonal vectors), the contour vectors contained in the set are connected in regular order as one circuitous loop in which the starting point of one contour vector is the end point of another contour vector without the contour vectors branching or merging. A contour vector whose starting point and end point have the same coordinates is a useless vector, of length zero and indeterminate direction, in terms of expressing a contour represented by a contour vector group to which the vector belongs. Such a contour vector is a cause of malfunction at the time of subsequent reproduction of the binary image. In order to prevent this malfunction, it is necessary to provide extra processing circuitry or processing modules to ascertain the presence of vectors of zero length and to eliminate such vectors if they exist. This leads to higher costs and longer processing time. This tendency is even more pronounced in prior art ②.

The second problem is that an image obtained as the result of zoom processing becomes even more distorted at the time of a size reduction than at the time of low magnification. This will be described based upon an example using FIGS. 4 through 8. FIG. 4 represents an example of a binary image in which the large, shaded circles signify black pixels, with the other pixels being white pixels. Further, x coordinates are plotted along the horizontal axis and y coordinates along the vertical axis. Thus, FIG. 4 expresses a digital binary image in which the seven pixels indicated by coordinates (2,1), (2,2), (3,3), (3,4), (3,5), (4,6), (4,7) are black pixels; all other pixels are white pixels. The "o" and "Δ" symbols express coarse-contour edge vectors extracted by the method disclosed in prior art ①. The "o" symbol indicates the starting point of a horizontal vector and the "Δ" symbol the starting point of a vertical vector. The extracted coarse-contour vector loop in FIG. 4 is expressed as a point sequence of 12 coarse contour points connected in the order (1.5,0.5)) →(1.5,2.5)→(2.5,2.5)→(2.5,5.5)→(3.5,5.5)→(3.5,7.5)→(4.5,7.5)→(4.5,5.5)→(3.5,5.5)→(3.5,2.5)→(2.5,2.5)→(2.5,0.5). Of course, the loop may be constructed by making the starting point the coarse contour point (2.5,0.5) expressed as the end of the point sequence and making the end point the coarse contour point (1.5,0.5) expressed as the starting point of the point sequence.

In FIG. 5, the coarse-contour vector loop obtained in the example of FIG. 4 is represented by the dashed lines and a contour vector loop obtained as the result of subjecting the same coarse-contour vector data to the first smoothing of prior art ① is indicated by the solid lines. The ⓧ marks indicate the contour points. In the case of this example, the contour points that have undergone first smoothing are set at the positions of the mid-points of the coarse-contour edge vectors constructing the coarse-contour vector loop.

In FIG. 6, the contour vector loop after first smoothing as shown in FIG. 5 is represented by the dashed lines. The solid lines indicate a contour vector loop obtained by subjecting the coarse-contour vector loop obtained in the example of FIG. 4 to smoothing that includes both the first smoothing and second smoothing, under a condition of 1:1 magnification, by the smoothing method disclosed in prior art ①. The ◎ marks indicate the contour points.

In FIG. 7, the contour vector loop after smoothing as shown in FIG. 6 is represented by the dashed lines. The solid lines indicate a contour vector loop obtained by subjecting the coarse-contour vector loop obtained in the example of FIG. 4 to smoothing and zooming by the smoothing/zoom method of prior art ① at a zoom ratio (reduction ratio) of 0.7 in the vertical and horizontal directions (namely an area ratio of approximately 0.5). The ⊗marks indicate the contour points.

When the thus obtained contour sequence constructing a contour vector loop resulting from the smoothing and zoom processing of prior art ①is expressed by coordinate values, we have the following in the example depicted in FIG. 7: (1.225,1.05)→(1.4,1.8375)→(1.75,2.8)→(2.1,3.7625)→(2.45,4.55))  →(2.8,5.075)→(2.975,4.55)→(2.8,3.7625)→(2.45,2.8)→(2.1,1.8375)→(1.75,1.05)→(1.4,0.7). A sequence of coordinate values obtained by rounding off each coordinate value so that the above sequence will approximate the whole-number grid of a digital image is as follows: (1,1)→(1,2)→(2,3)→(2,4)→(2,5)→(3,5)→(3,5)→(3,4)→(2,3)→(2,2)→(2,1)→(1,1). Thus, contour vectors of length zero having equal starting and end point coordinate values occur, such as at (3,5)→(3,5) and at the end point (1,1) and starting point (1,1).

In FIG. 8, the contour vector loop after smoothing and zooming as shown in FIG. 7 is represented by the dashed lines. The solid lines indicate a vector sequence connecting a sequence of coordinate values obtained by subjecting the sequence of contour points constructing the same contour vector loop to a whole-number conversion by rounding off in the manner described above. The whole-number grid positions (the pixels indicated by the whole-number coordinates) inside the area (inclusive of the boundary) delimited by this sequence of coordinate values are expressed as black pixels.

A comparison of FIGS. 4 and 8 shows that FIG. 4 is a black-pixel region comprising seven pixels, while FIG. 8 is the result of subjecting this region to processing at a zoom ratio corresponding to about 0.5× in terms of area ratio. FIG. 8 is produced as a black-pixel region comprising nine pixels. The region is thicker and darker.

Thus, in a case where an image represented by outline vectors is subjected to processing for size reduction, vectors having indeterminate direction are produced and the original image cannot be varied in power faithfully.

SUMMARY OF THE INVENTION

The present invention has been devised in view of the shortcomings of the prior art described above and its object is to obtain a reduced image having an image quality higher than that of the conventional zoom method applied independently in the vertical and horizontal directions, to suppress the occurrence of useless contour points in comparison with the conventional case in which a direct size reduction is made by a zoom method using outline vectors, to conserve memory needed for handling vector data and to dispense with processing circuitry or processing modules required in the prior art to prevent malfunction due to vectors of indeterminate direction.

In accordance with the present invention, use is made of an enlargement step based upon a smooth zooming method using contour information, such as disclosed in prior art ① or ②, and a reduction step based upon a second zooming method different from that of the enlargement step. A high-quality enlarged image based upon an enlargement method using contour information is generated in an initial stage. In the next stage, a reduced image based upon the second zooming method is produced with regard to the enlarged image mentioned above, whereby there is obtained a zoomed image having a desired magnification.

According to the present invention, the foregoing object is attained by providing an image processing apparatus comprising extracting means for extracting contour vectors of an image from a binary image, first zooming means for zooming image data, which is represented by the contour vectors, at a first zoom ratio, reproducing means for reproducing the binary image from the image data represented by the contour vectors and zoomed by the first zooming means, second zooming means for zooming the binary image, which has been reproduced by the reproducing means, at a second zoom ratio, and control means for controlling the first zooming means and the second zooming means in such a manner that a zoom ratio, which is obtained by combining the first and second zoom ratios, becomes a desired zoom ratio.

The first zoom ratio of the first zooming means preferably is unity or greater.

The second zoom ratio of the second zooming means preferably is given in such a manner that the second zoom ratio becomes unity or greater.

The second zooming means preferably reduces the binary image by a selective processing conversion of pixels.

The second zooming means preferably reduces the binary image by a projection method.

The second zooming means preferably reduces the binary image by the PRES method.

In a preferred embodiment, the apparatus further comprises output means for outputting the binary image zoomed by the second zooming means.

In a preferred embodiment, the output means includes a printer for printing out the binary image.

In a preferred embodiment, the output means includes a display for displaying the binary image.

In a preferred embodiment, the output means includes communication means for outputting the binary image via communication.

In a preferred embodiment, the output means includes encoding means for encoding the binary image by a prescribed encoding method.

In a preferred embodiment, the output means includes a printing device for printing out the binary image.

In a preferred embodiment, the first zooming means includes smoothing means for smoothing the contour vectors.

Further, according to the present invention, the foregoing object is attained by providing a method of controlling an image processing apparatus for zooming image data by first zooming means which zooms the image data in a form represented by contour vectors and second zooming means for zooming the image data, in a form represented by a bit map, at a prescribed zoom ratio, the method comprising a magnification deciding step of deciding a magnification by the second zooming means based upon zooming by the first zooming means and zooming by the second zooming means in such a manner that original image data is zoomed at a prescribed zoom ratio, and a zooming step of zooming contour vector data at the magnification decided at the magnification deciding step.

The zoom ratio of the second zooming means preferably is less than unity.

Further, the foregoing object is attained by providing a method of controlling an image processing apparatus comprising an extracting step of extracting contour vectors of an image from a binary image, a first zooming step of zooming image data, which is represented by the contour vectors, at a first zoom ratio, a reproducing step of reproducing the binary image from the image data represented by the contour vectors and zoomed at the first zooming step, and a second zooming step of zooming the binary image, which has been reproduced at the reproducing step, at a second zoom ratio in such a manner that a zoom ratio, which is obtained by combining the first zoom ratio and the second zoom ratio, becomes a desired zoom ratio.

The first zoom ratio of the first zooming step preferably is unity or greater.

The second zoom ratio of the second zooming step preferably is less than unity.

The second zooming step preferably reduces the binary image by a selective processing conversion of pixels.

The second zooming step preferably reduces the binary image by a projection method.

The second zooming step preferably reduces the binary image by the PRES method.

In a preferred embodiment, the method further comprises an output step of outputting the binary image zoomed at the second zooming step.

In a preferred embodiment, the output step includes a printing step of printing out the binary image.

In a preferred embodiment, the output step includes a display step of displaying the binary image.

In a preferred embodiment, the output step includes a communication step of outputting the binary image via communication.

In a preferred embodiment, the output step includes an encoding step of encoding the binary image by a prescribed encoding method.

In a preferred embodiment, the output step outputs the binary image by a printer for printing out the binary image.

In a preferred embodiment, the first zooming step includes a smoothing step of smoothing the contour vectors.

In accordance with the image processing apparatus and method of controlling the same described above, zooming using outline vectors is employed to enlarge an image, after which the binary image data is reduced, thereby making it possible to obtain a reduced image having a high image quality.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 18 is a diagram for describing an overview of the prior art;

DESCRIPTION OF THE PREFERRED EMBODIMENTS

<First Embodiment>

Figure 1:
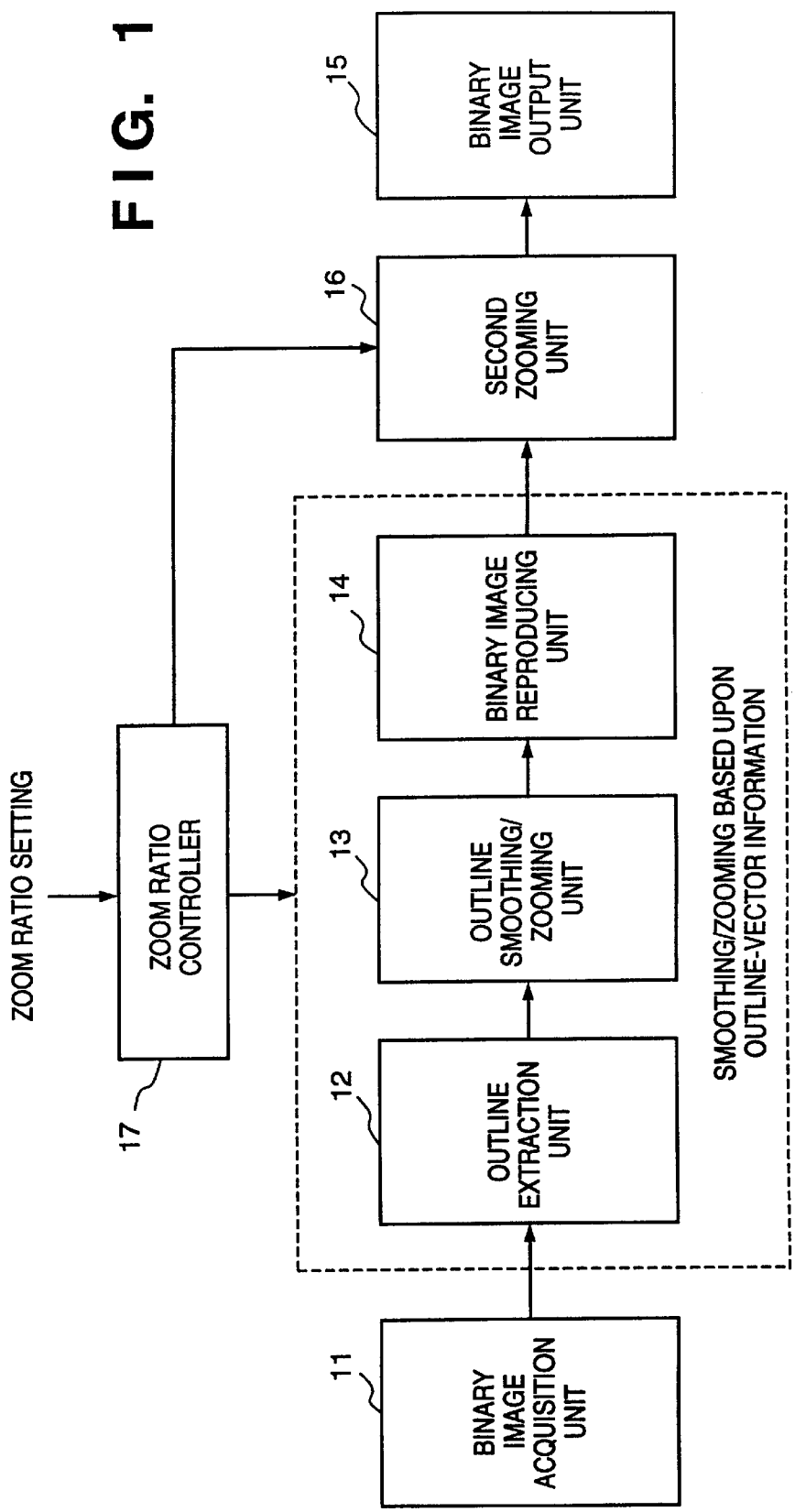
FIG. 1 is a block diagram best showing the features of an image processing apparatus according to the present invention.
Figure 9:
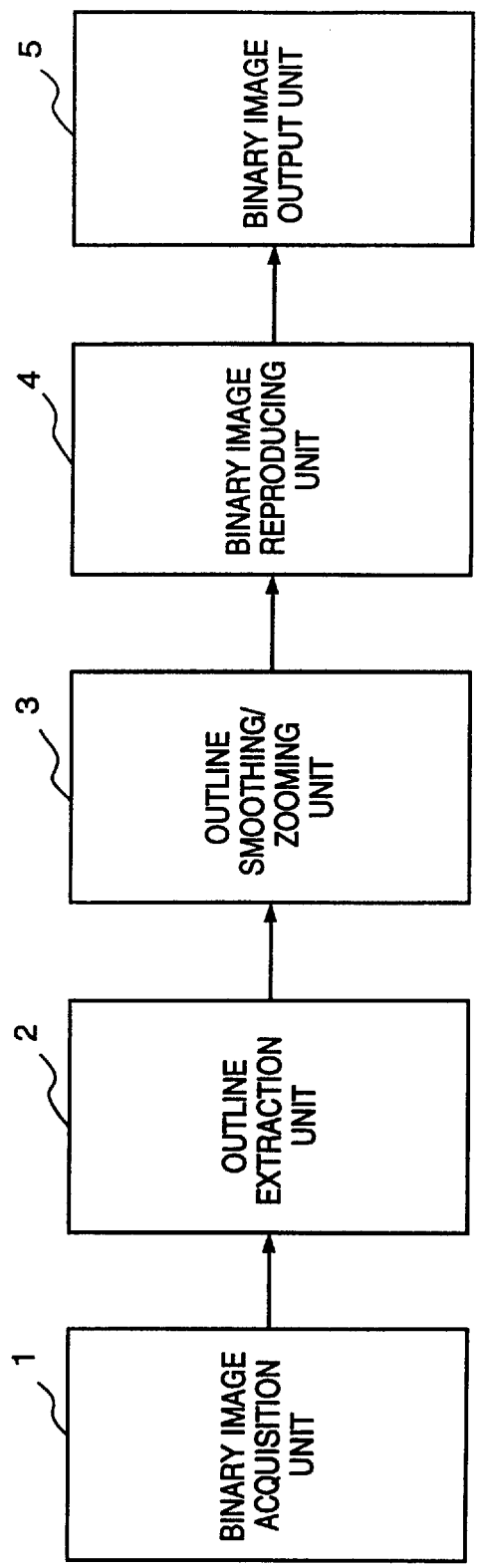
FIG. 9 is a diagram for describing an overview of the prior art.
Figure 10B:
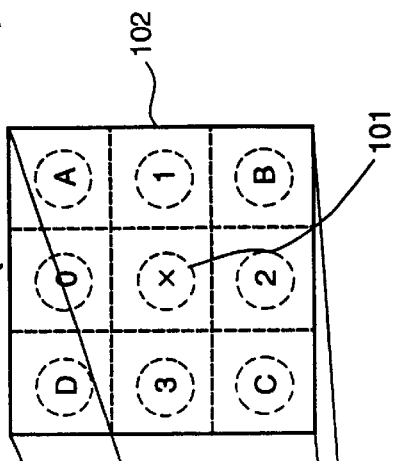
FIG. 10 is a diagram for describing an overview of the prior art.
Figure 10A:
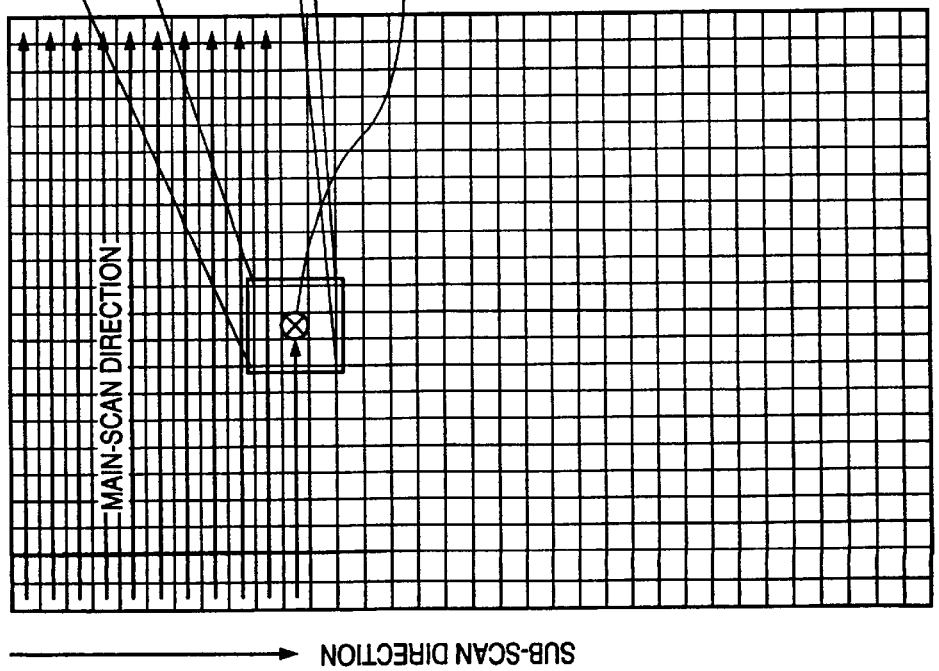
Figure 11A:
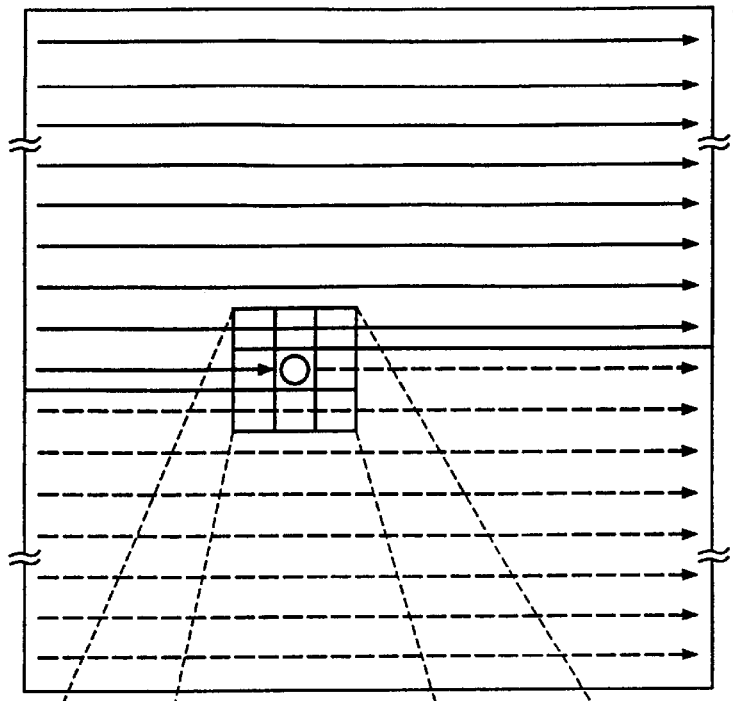
FIG. 11 is a diagram for describing an overview of the prior art.
Figure 11B:
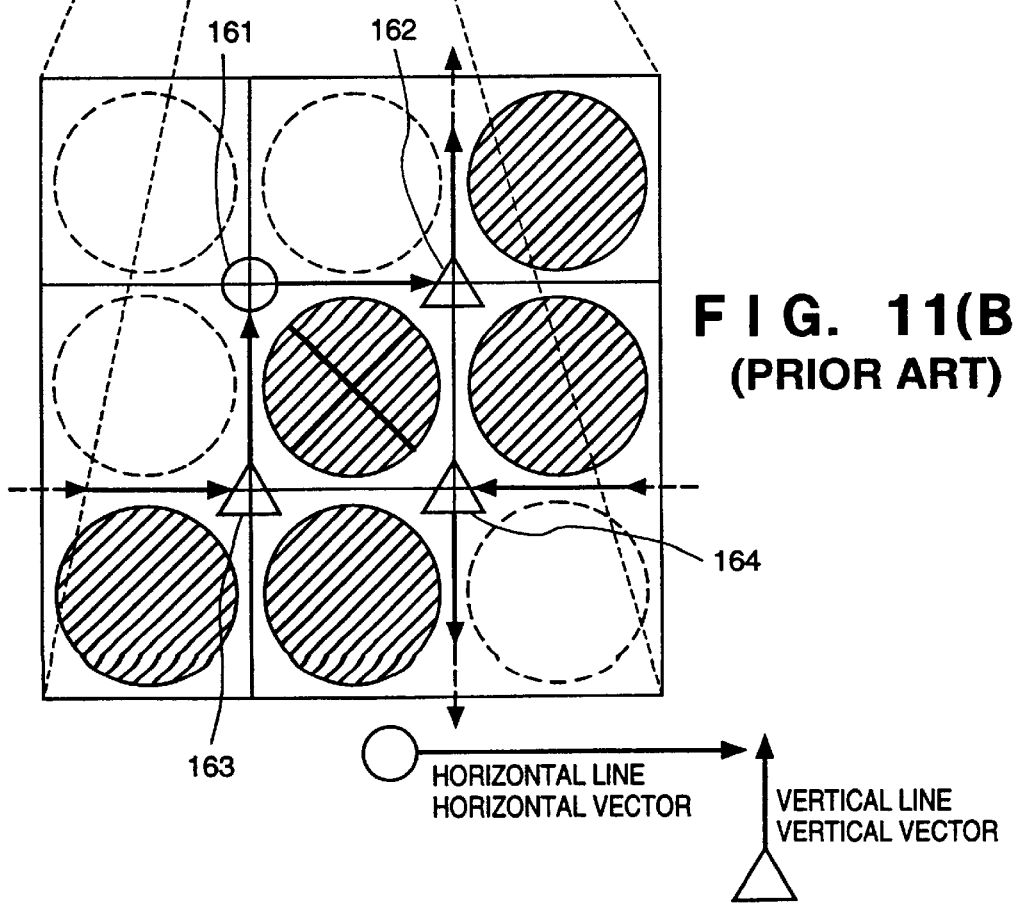
Figure 12:
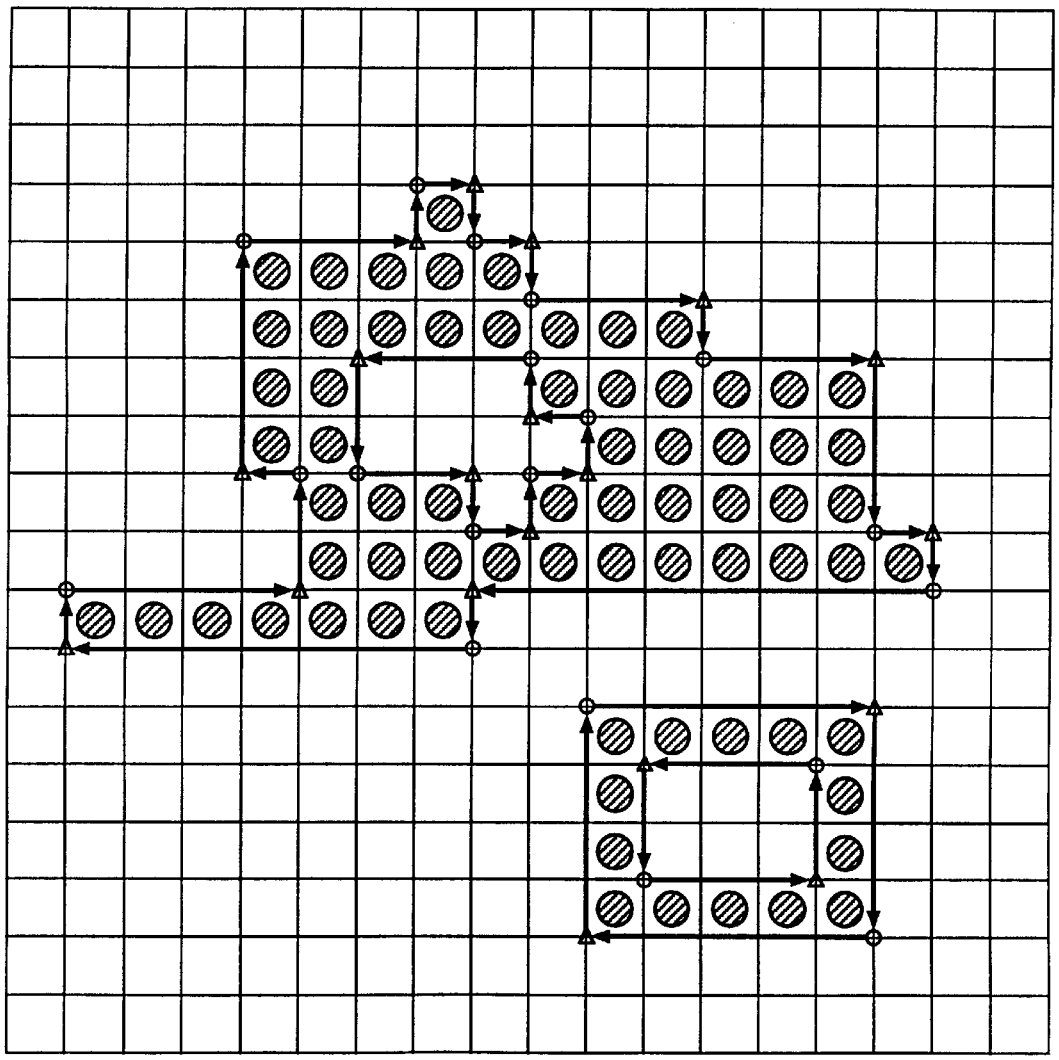
FIG. 12 is a diagram for describing an overview of the prior art.
Figure 13:
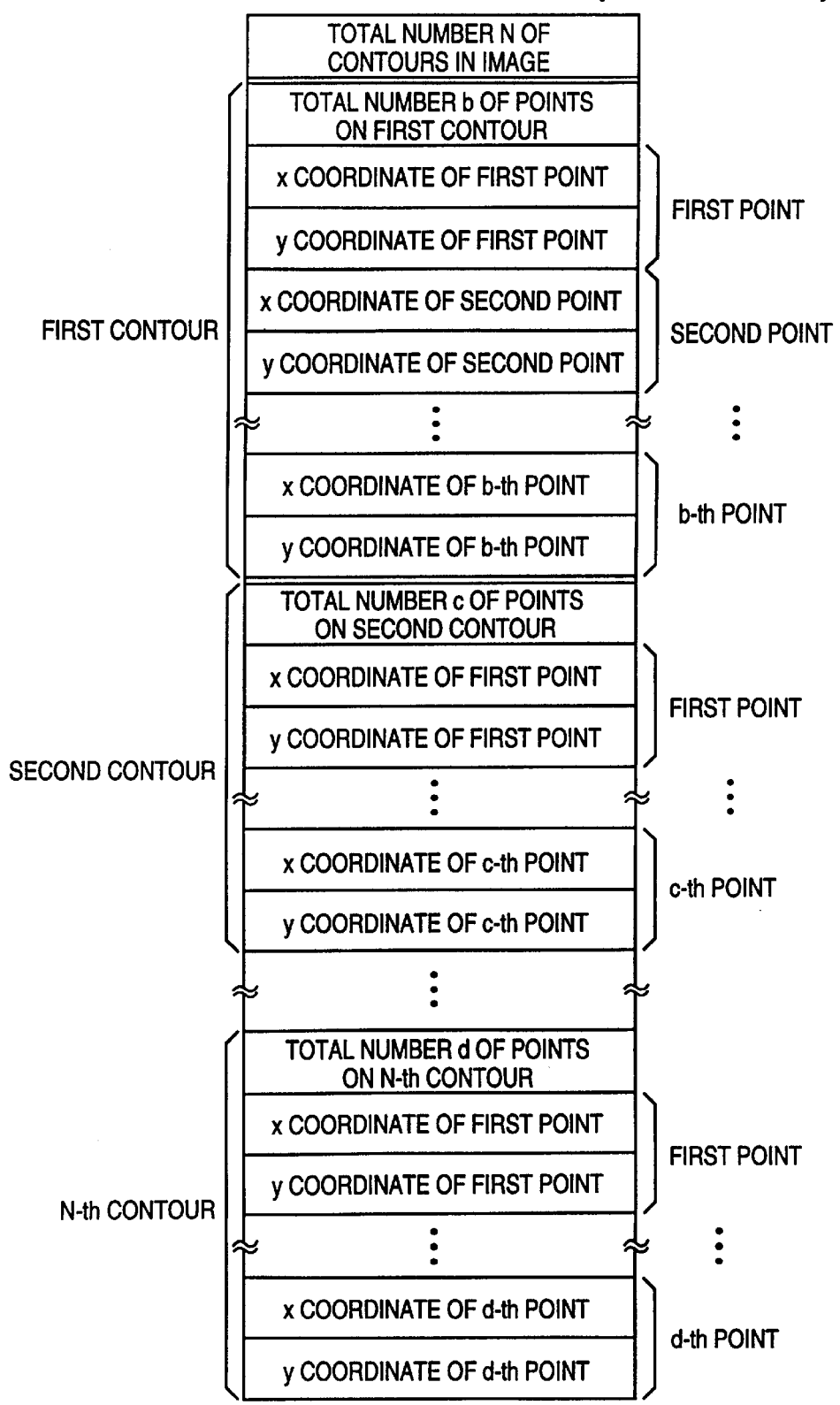
FIG. 13 is a diagram for describing an overview of the prior art.
Figure 14:
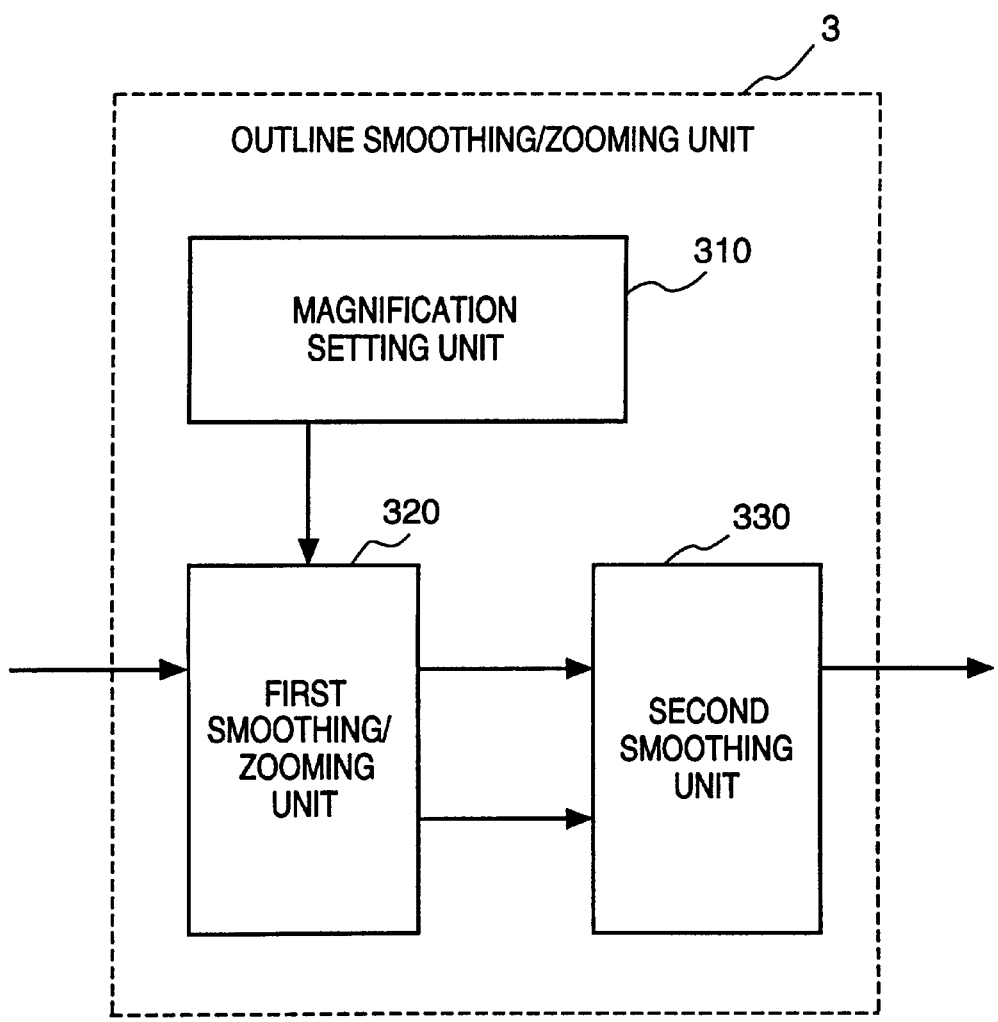
FIG. 14 is a diagram for describing an overview of the prior art.

FIG. 1 is a block diagram best showing the features of an image processing apparatus according to the present invention. Blocks 11 to 15 in FIG. 1 are basically the same as blocks 1 to 5 in FIG. 9 used to describe the prior art.

A binary image acquisition unit 11 in FIG. 1 acquires a digital binary image that is to undergo zoom processing and outputs the binary image in a raster-scan format. More specifically, the binary image acquisition unit 11 corresponds to an image reader for reading an original by photoelectric scanning, binarizing the image and then outputting the same; an original reading unit (which includes a binarizing function) of a facsimile machine; a receiving/decoding unit of a facsimile machine which includes a receiving function for receiving image data via a communication line, as well as a function for decoding and returning, to the digital binary image, image data that has been encoded in accordance with an encoding scheme (MH, MR, MMR, etc.) used at the time of transmission and reception; an original reading unit (which includes a binarizing function) of a digital copier; a LAN (local area network); or an interface, such as an RS232C, Centronics or SCSI, for entering binary image data via communication means.

An outline extraction unit 12 extracts a coarse contour vector (an outline vector prior to application of smoothing and zoom processing) from the binary image having the raster-scan format. This unit is the same as the outline extraction unit 2 described earlier in the discussion of the prior art.

An outline smoothing/zooming unit 13 smoothes and applies zoom processing to the coarse contour vector data in the form of vector data. This unit is the same as the outline smoothing/zooming unit 3 described earlier in the discussion of the prior art.

A binary image reproduction unit 14 reproduces the binary image data in the raster-scan format from the outline vector data. This unit is the same as the binary image reproduction unit 4 described earlier in the discussion of the prior art.

Numeral 16 denotes a second zooming unit different from means for performing smoothing and zooming using outline vector information. The second zooming unit 16 is constituted by a reduction circuit, of the kind shown in FIG. 2, for applying a ½ size reduction in each of the longitudinal and horizontal directions, by way of example. The unit 16 includes a main-scan synchronizing ½ frequency divider 501 for frequency-dividing an input main-scan synchronizing clock 507 to produce an output main-scan synchronizing clock of one-half the frequency (i.e., twice the period) of the input clock; a sub-scan synchronizing ½ frequency divider 502 for frequency-dividing an input sub-scan synchronizing clock 508 to produce an output sub-scan synchronizing clock 511 of one-half the frequency (i.e., twice the period) of the input clock; a demultiplexer 503, to which an image signal 509 is applied as an input, for selectively outputting the image signal data input lines 513, 514 leading to two FIFOs (first-in first-out memories) 504, 505, respectively; and a selector 506, to which data output lines 515, 516 from the FIFOs 504, 505 are connected as input lines, for selecting either one of the input signals and outputting it to an image signal output 512.

Figure 3:
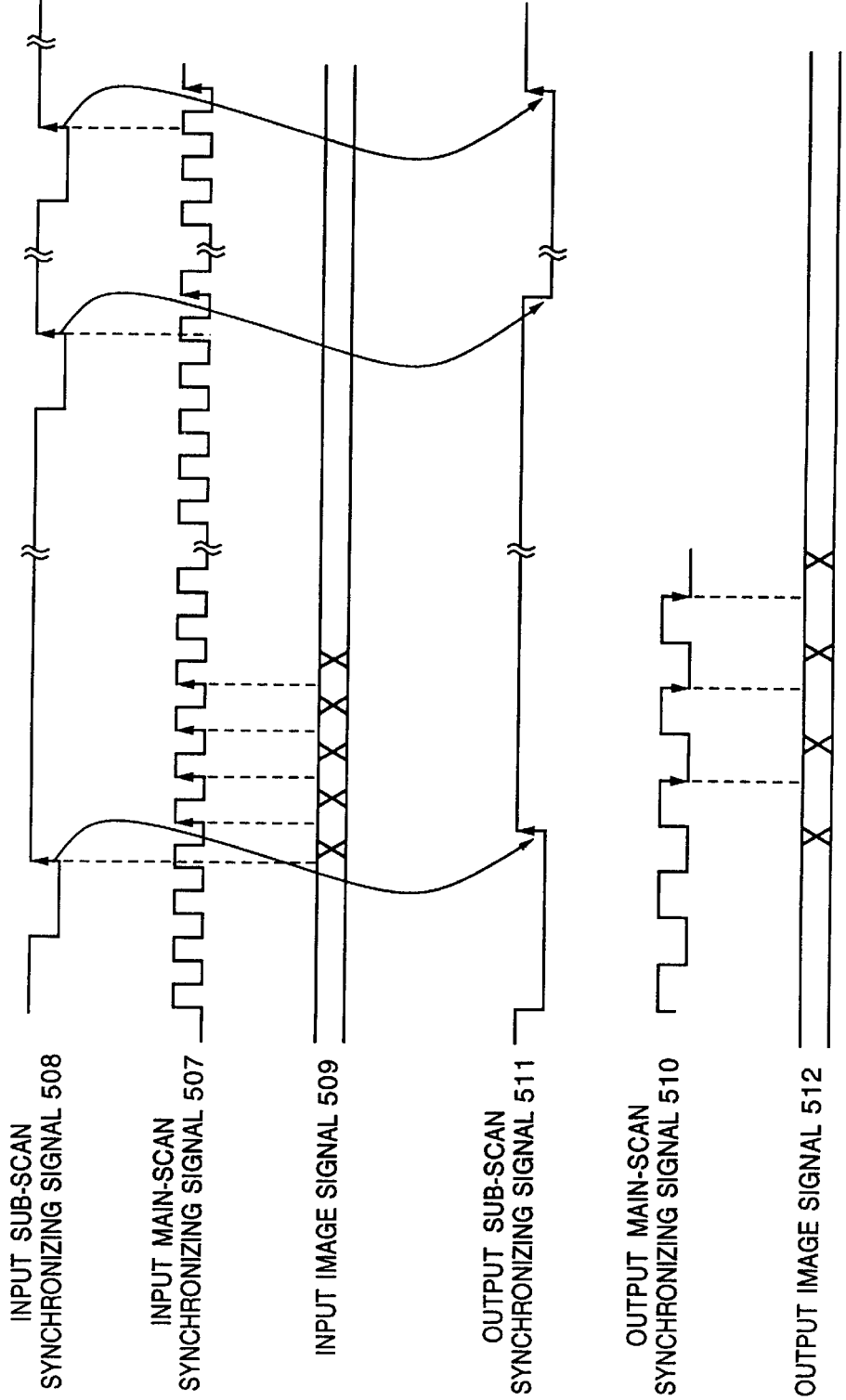
FIG. 3 is a diagram showing raster-scan synchronizing signals assuming the arrangement of FIG. 2 is used.
Figure 4:
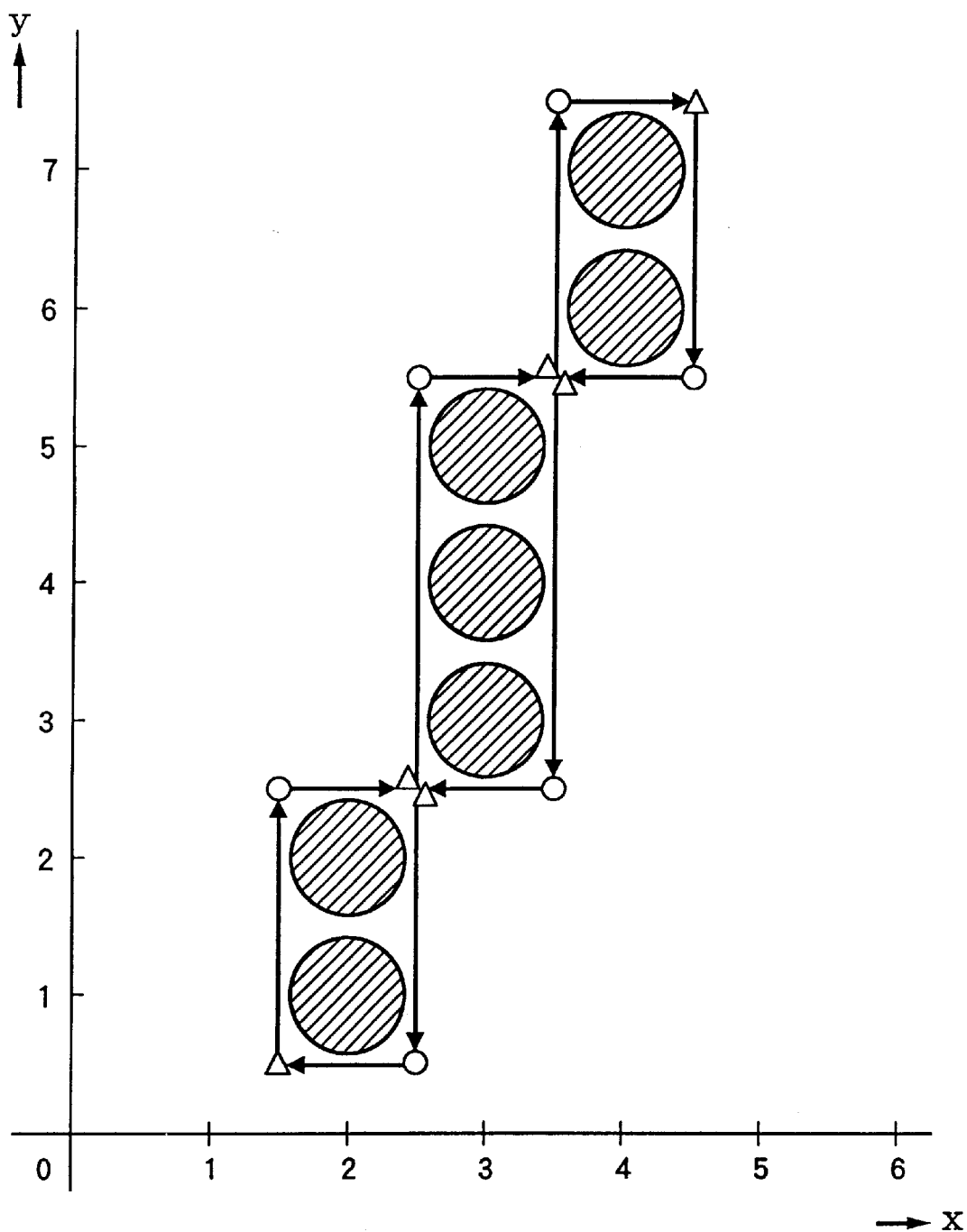
FIG. 4 is a diagram for describing the shortcomings of the prior art.
Figure 5:
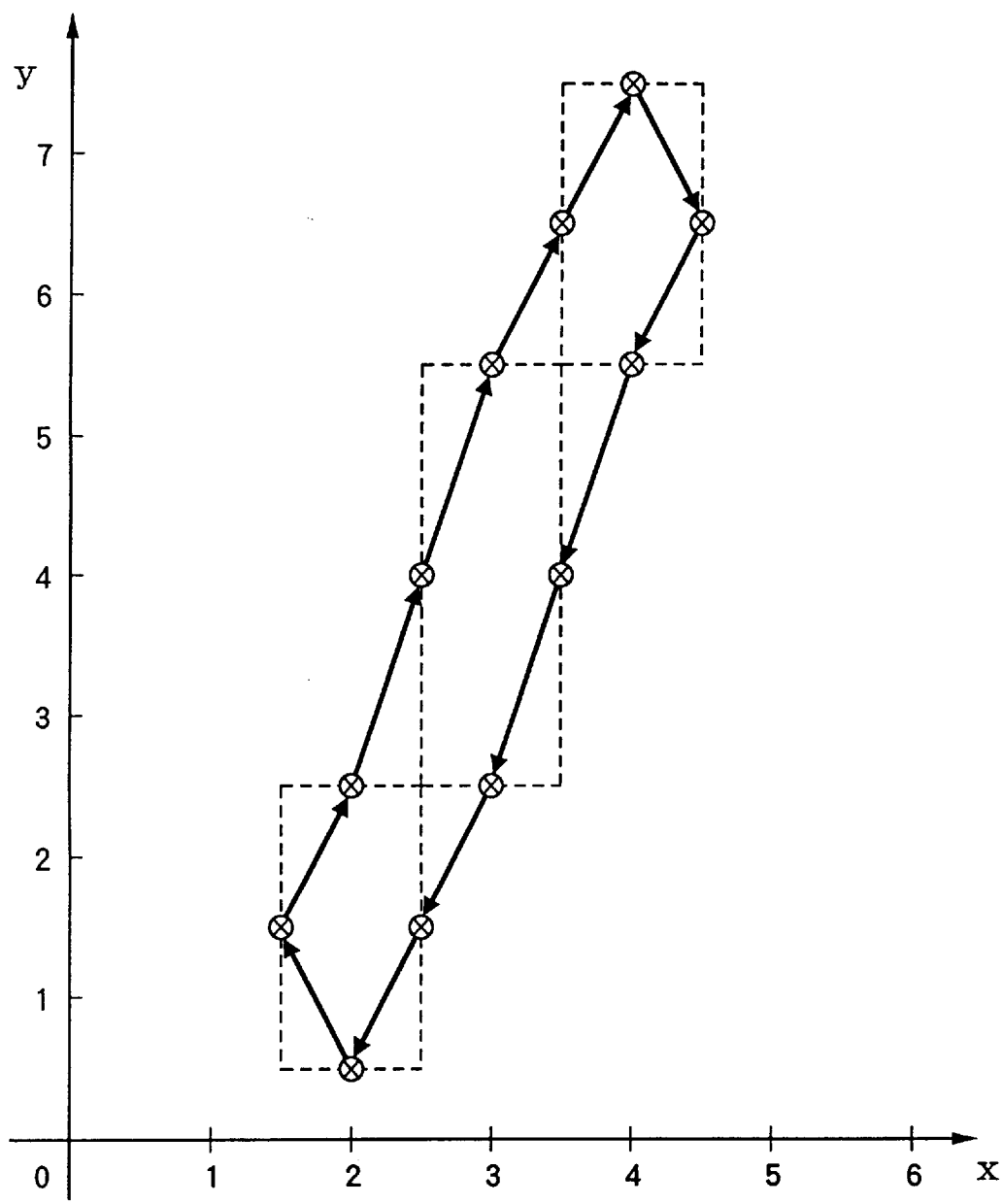
FIG. 5 is a diagram for describing the shortcomings of the prior art.
Figure 6:
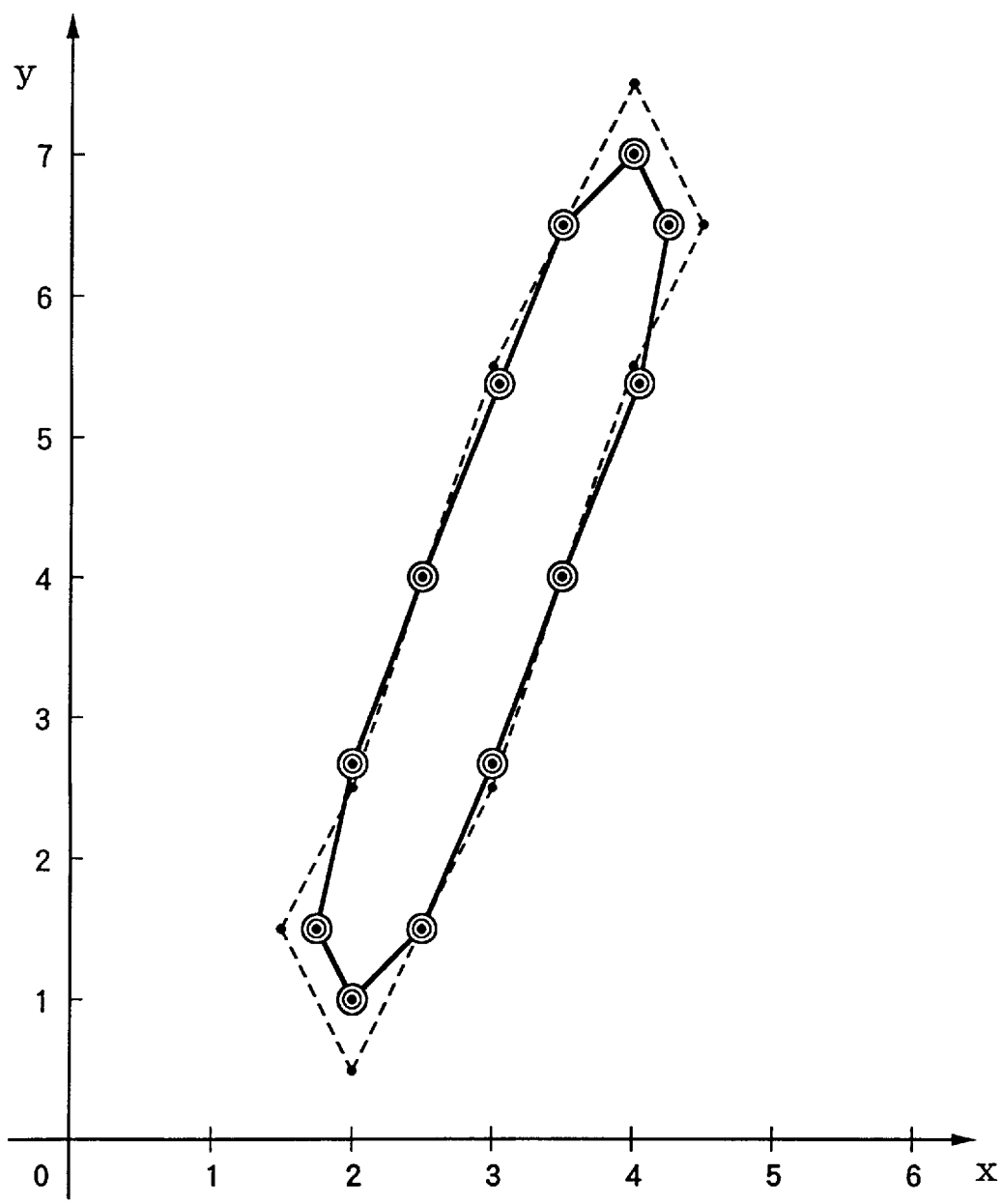
FIG. 6 is a diagram for describing the shortcomings of the prior art.
Figure 7:
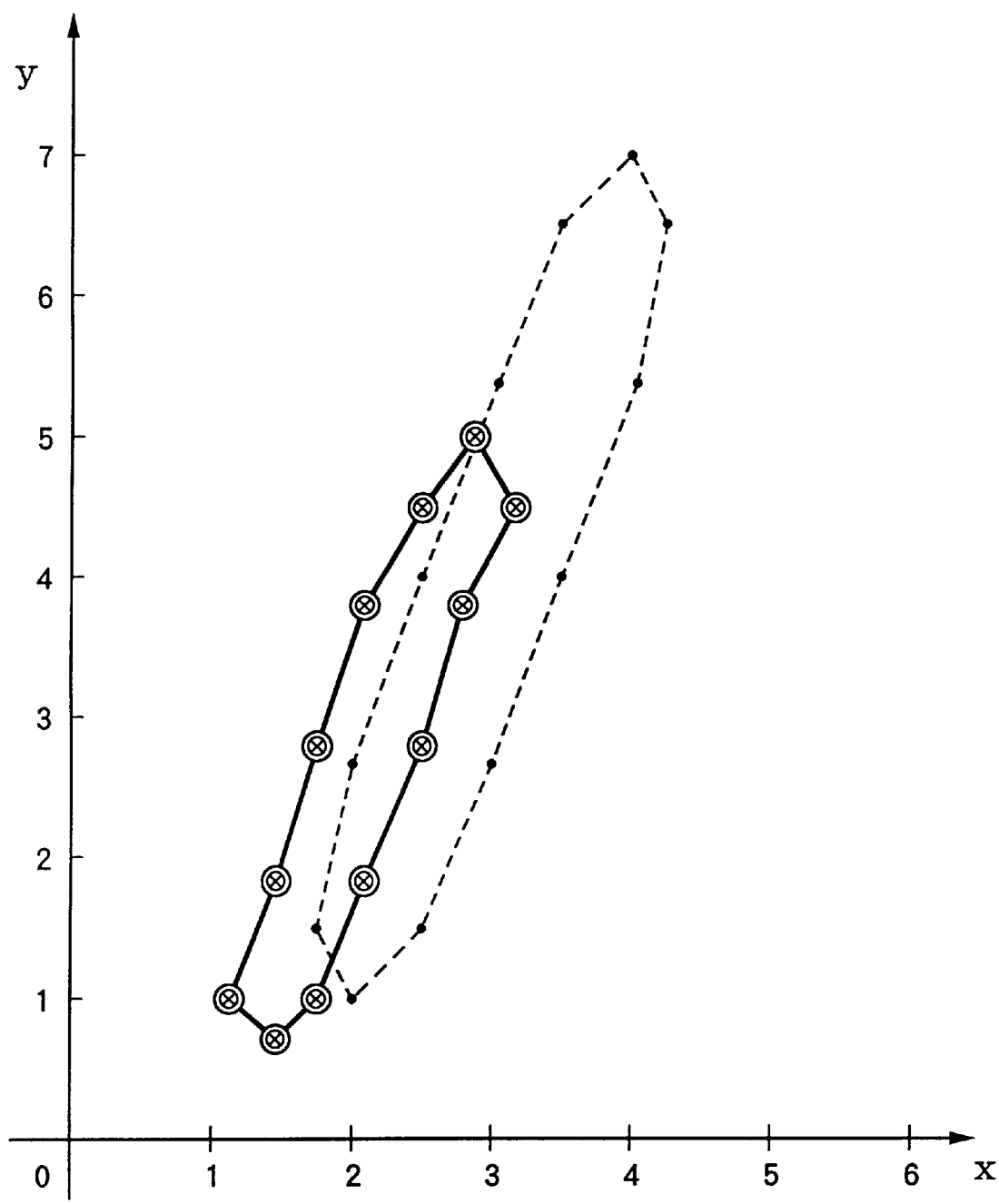
FIG. 7 is a diagram for describing the shortcomings of the prior art.
Figure 8:
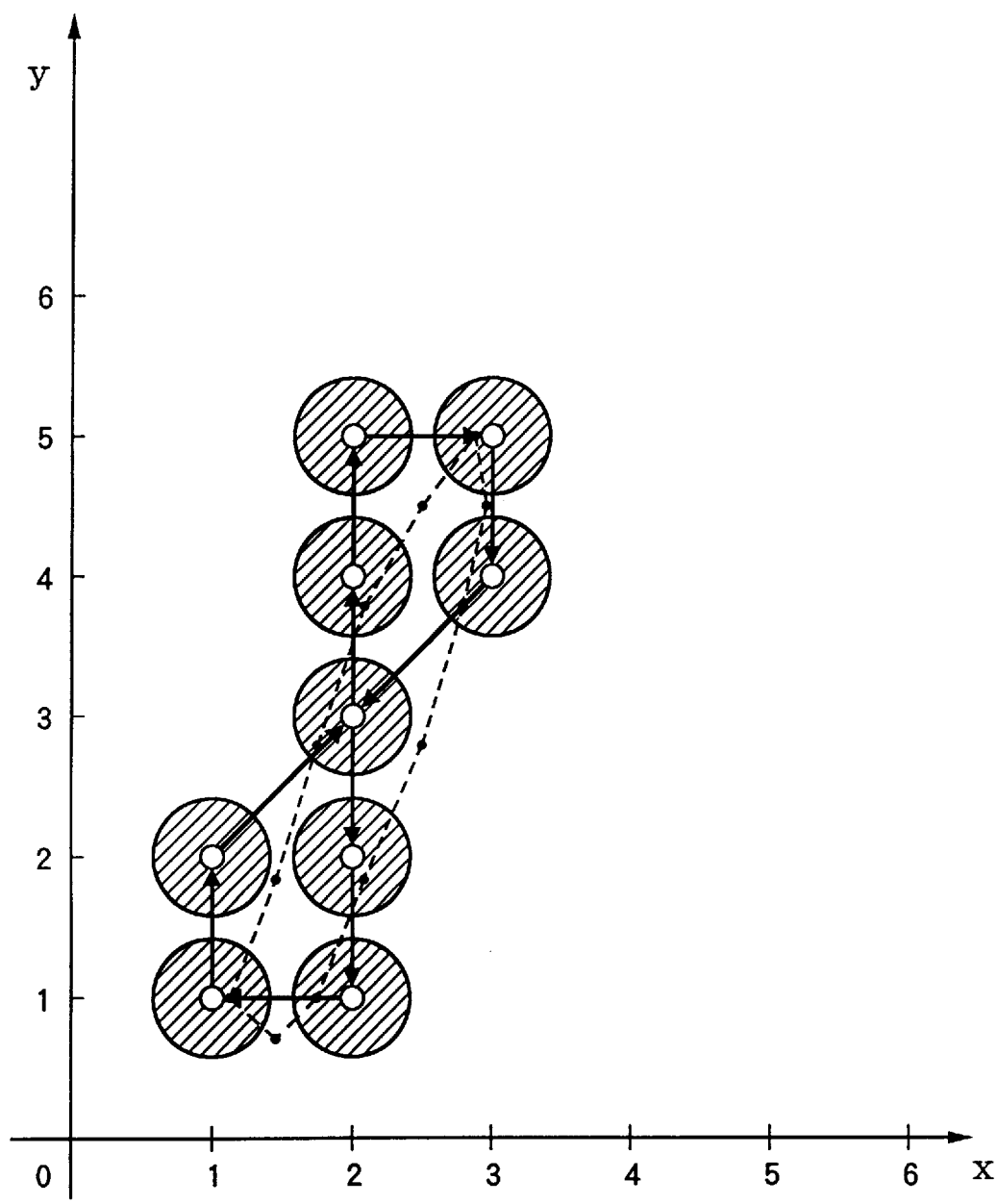
FIG. 8 is a diagram for describing the shortcomings of the prior art.

FIG. 3 is a timing chart showing image data, entered together with the image signal 509, along with the sub-scan synchronizing signal 508 giving the starting timing of scanning lines and the main-scan synchronizing signal 507 giving the effective timing of each pixel on a scanning line. In FIG. 3, the starting timing of scanning lines is given by the leading edge of the sub-scan synchronizing signal 508. The first leading edge of the input main-scan synchronizing signal 507 that appears after the starting time of the scanning line gives the timing at which data indicative of the leading pixel on this scanning line is applied as the input image signal 509.

Figure 2:
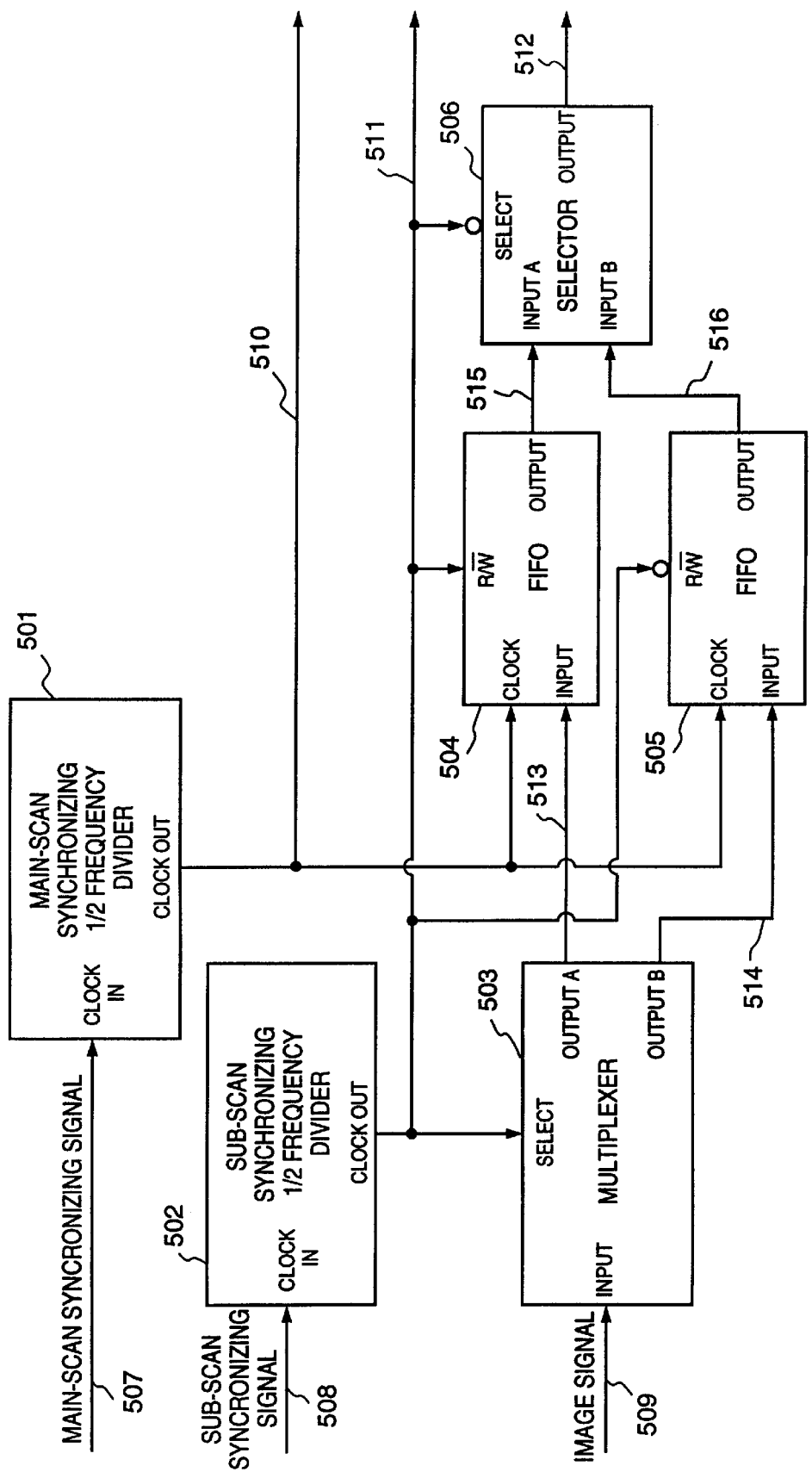
FIG. 2 is a diagram showing an example of the construction of second zooming means.

When the raster-scanned image data thus entered is fed into the reduction circuit of FIG. 2, first the sub-scan synchronizing signal is frequency-divided by the sub-scan synchronizing ½ frequency divider 502 in the manner indicated by the output sub-scan synchronizing signal 511 in FIG. 3. The frequency-divided signal is outputted as the sub-scan synchronizing signal for output. The output sub-scan signal 511 is applied to the demultiplexer 503 as well, where the signal is used as a signal for switching over the connection to the FIFO. The signal 511 is also fed into the FIFOs 504, 505 and is used as a signal changing over between write-enable and read-enable.

The main-scan synchronizing signal 507 is frequency-divided by the main-scan synchronizing ½ frequency divider 501 in the manner indicated by an output main-scan synchronizing signal 510 shown in FIG. 3. The frequency-divided signal is delivered as a main-scan synchronizing signal for output. The output main-scan synchronizing signal 510 is delivered also to the FIFOs 504, 505, where the signal is used as a write synchronizing signal and a read synchronizing signal for each FIFO. The output sub-scan synchronizing clock 511 is also used as the selection signal of the selector 506. That is, of the two FIFOs, the selector 506 selects the output from the FIFO that has not been selected by the demultiplexer 503 and delivers this as the output image signal 512. The input image signal is zoomed to one-half both vertically and horizontally by the circuitry described above.

With reference again to FIG. 1, numeral 17 denotes a zoom ratio controller for performing control in such a manner that a magnification desired to be obtained in overall processing is set by being divided up into the zoom ratio of the outline smoothing/zooming unit 13 and the zoom ratio of the second zooming unit 16, as a result of which the desired magnification is realized.

The circuit of FIG. 2 described above has a reduction ratio of ½ both vertically and horizontally. Accordingly, the zoom ratio controller 17 need only double (apply a bit shift to) a zoom ratio that has already been set by a DIP switch or dial switch and deliver the resulting zoom ratio to the outline smoothing/zooming unit 13, or double (apply a bit shift to) a magnification applied from some external device via an interface (I/F) and deliver the result to the outline smoothing/zooming unit 13. In other words, upon taking into consideration the processing magnification of the second zooming unit 16, the zoom ratio controller 17 provides the outline smoothing/zooming unit 13 with information indicating how much the size of image data applied as an input should be multiplied independently in the main-scan (horizontal) direction and sub-scan (vertical) direction.

Figure 20:
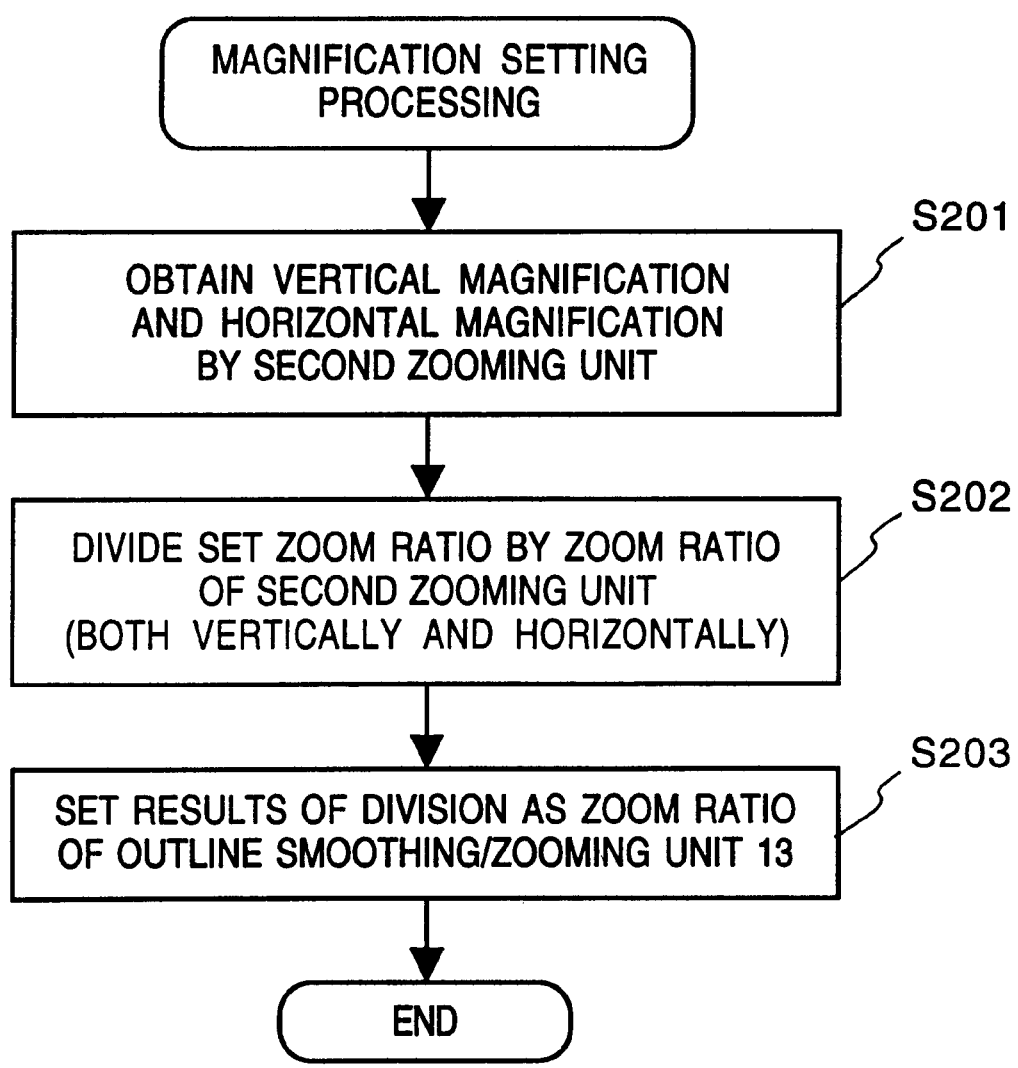
FIG. 20 is a flowchart of a procedure for controlling zoom ratio according to the present invention.

FIG. 20 is a flowchart of a procedure for controlling zoom ratio by means of the zoom-ratio controller 17.

First, at step S201, the zoom ratio in each of the vertical and horizontal directions is obtained from the second zooming unit 16. This may be accomplished by reading the zoom ratios from the second zooming unit 16. Alternatively, the zoom ratios may be values that have been entered in advance. Next, at step S202, a zoom ratio that has been set as by the operator is divided by each of the zoom ratios of the second zooming unit obtained at step S201. The values obtained serve as the zoom ratios of the outline smoothing/zooming unit 13. Finally, at step S203, the zoom ratios calculated at step S202 are set as the magnifications in the outline smoothing/zooming unit 13.

The apparatus constructed as set forth above operation in the manner described below.

The binary image from the binary image capture unit 11 enters the outline extraction unit 12 in a raster-scan format. When this occurs, the outline extraction unit 12 extracts coarse contour vector data from the binary image and outputs the data to the outline smoothing/zooming unit 13. In accordance with the zoom ratio that has been set by the zoom ratio controller 17 (namely a magnification twice that of a magnification desired to be finally obtained in the main-scan direction and sub-scan direction), the outline smoothing/zooming unit 13 applies smoothing/zooming processing in the form of the outline vectors (based upon an arithmetic operation with regard to coordinate values or contour edge lengths), generates vector data that has undergone smoothing and zooming processing and outputs this data to the binary image reproduction unit 14. On the basis of the outline vector data obtained by the outline extraction unit 12, the binary image reproduction unit 14 outputs, in a raster-scan format, a binary image obtained by filling the region bounded by the vector figure expressed by the outline vector data. The raster-scan binary image data outputted by the binary image reproduction unit 14 is subjected to SPC by the second zooming unit 16 of FIG. 2 so as to be reduced by a factor of one-half both vertically and horizontally. The second zooming unit 16 outputs the result, in the raster-scan format, as a binary image zoomed at the magnification desired to be finally obtained. The binary image data outputted from the binary image reproduction unit in the raster-scan format is displayed as a soft copy on a CRT, is printed out as a hard copy on paper or is delivered to communication line or the like by the binary image output unit 15.

The binary image output unit 15 corresponds to a printer device, to which the binary image in the raster-scan format is applied, for printing out the image on paper as a hard copy; a display device for displaying the binary image on the screen of a CRT; the printer unit of a digital copier; the printer unit of a facsimile machine; an encoding transmission unit of a facsimile machine which includes a function for performing encoding in accordance with an encoding scheme (MH, MR, MMR, etc.) used at the time of transmission and reception of image data via a communication line, as well as a function for transmitting data via a communication line; a LAN; or an interface, such as an RS232C, Centronics or SCSI, for entering binary image data via communication means.

Thus, as described above, an image having a size which, in both the vertical and horizontal directions, is twice that of an image eventually outputted is produced by the outline smoothing/zooming unit 13. As a consequence, a figure representing a great departure from an original image is no longer outputted even by zoom processing by the outline smoothing/zooming unit 13, and the second zooming unit 16 merely subjects this output image to simple SPC to obtain a size of $$\frac{1}{2}$$

both horizontally and vertically. As a result, the zoomed image eventually obtained is one that has been subjected to zoom processing faithfully with regard to the original image.

Figure 15:
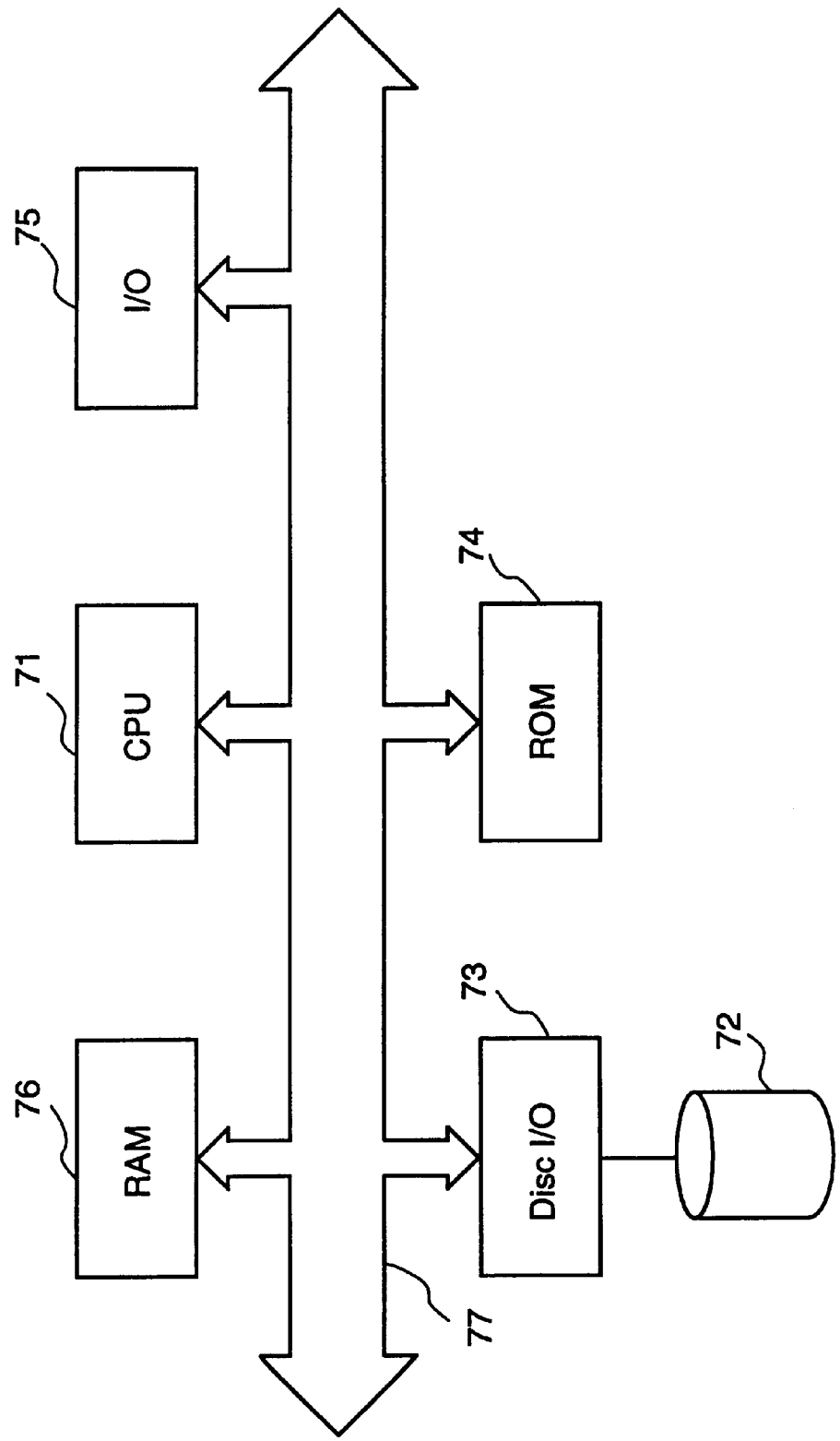
FIG. 15 is a diagram for describing an overview of the prior art.
Figure 16:
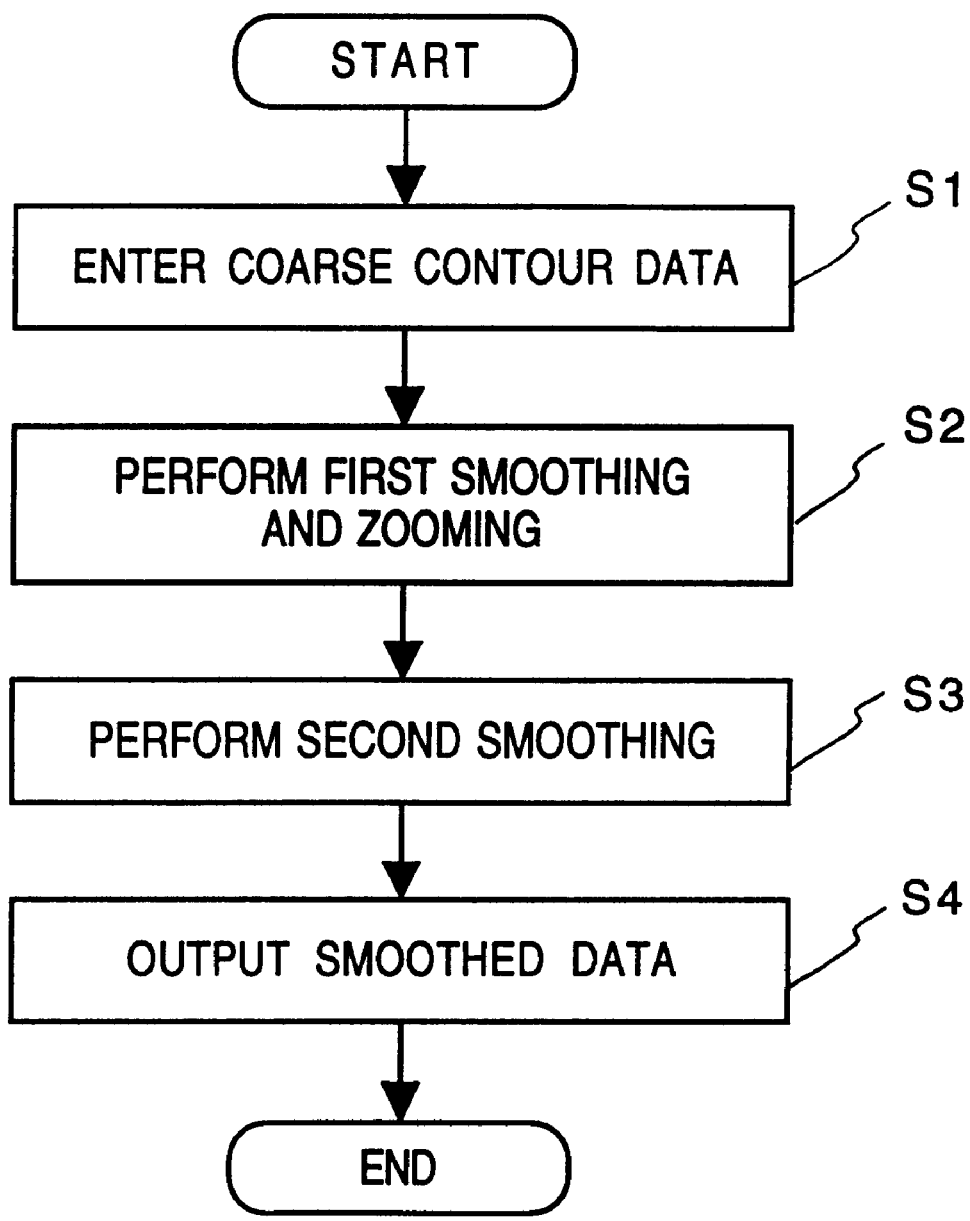
FIG. 16 is a diagram for describing an overview of the prior art.
Figure 17:
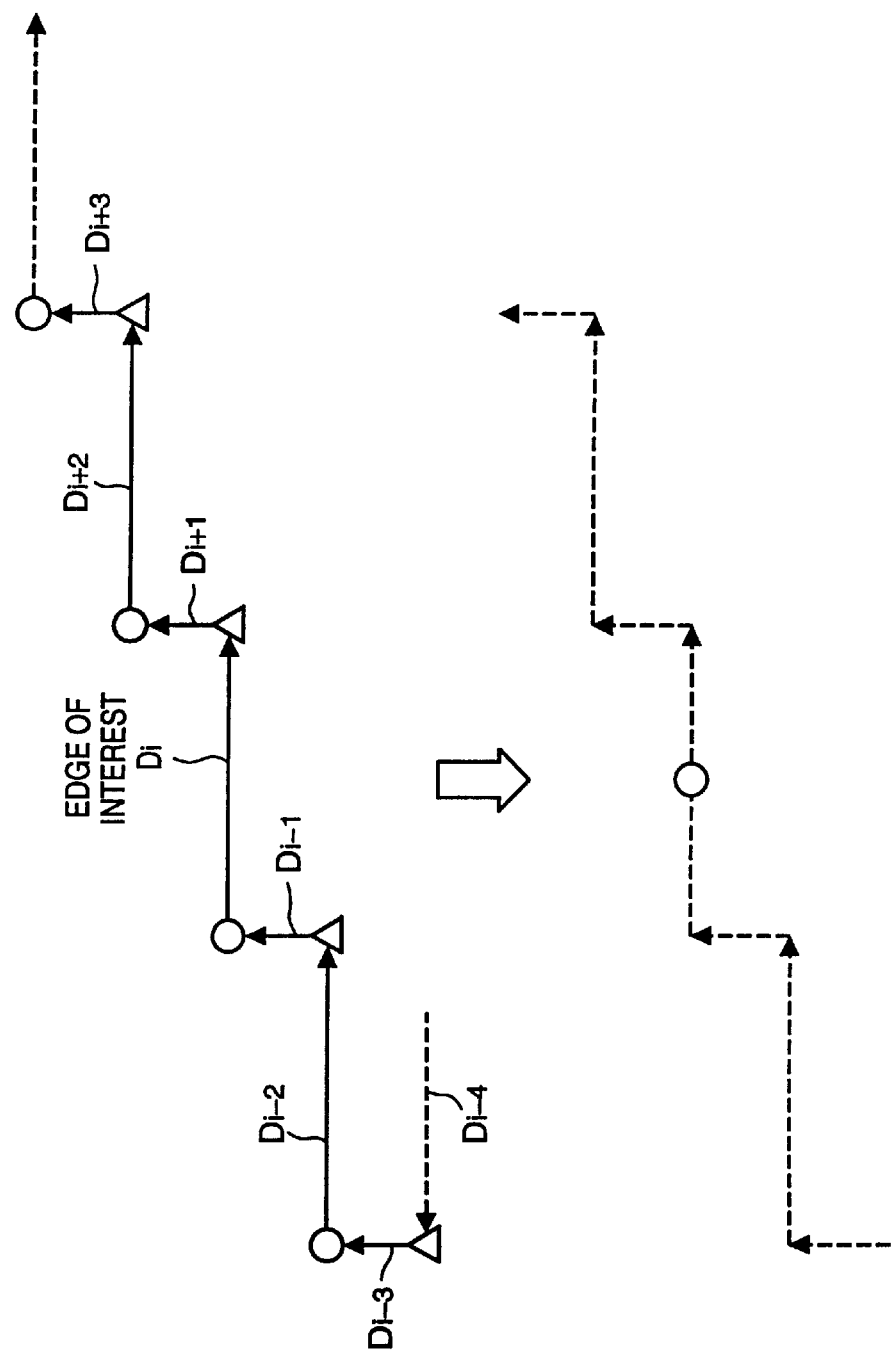
FIG. 17 is a diagram for describing an overview of the prior art.
Figure 19:
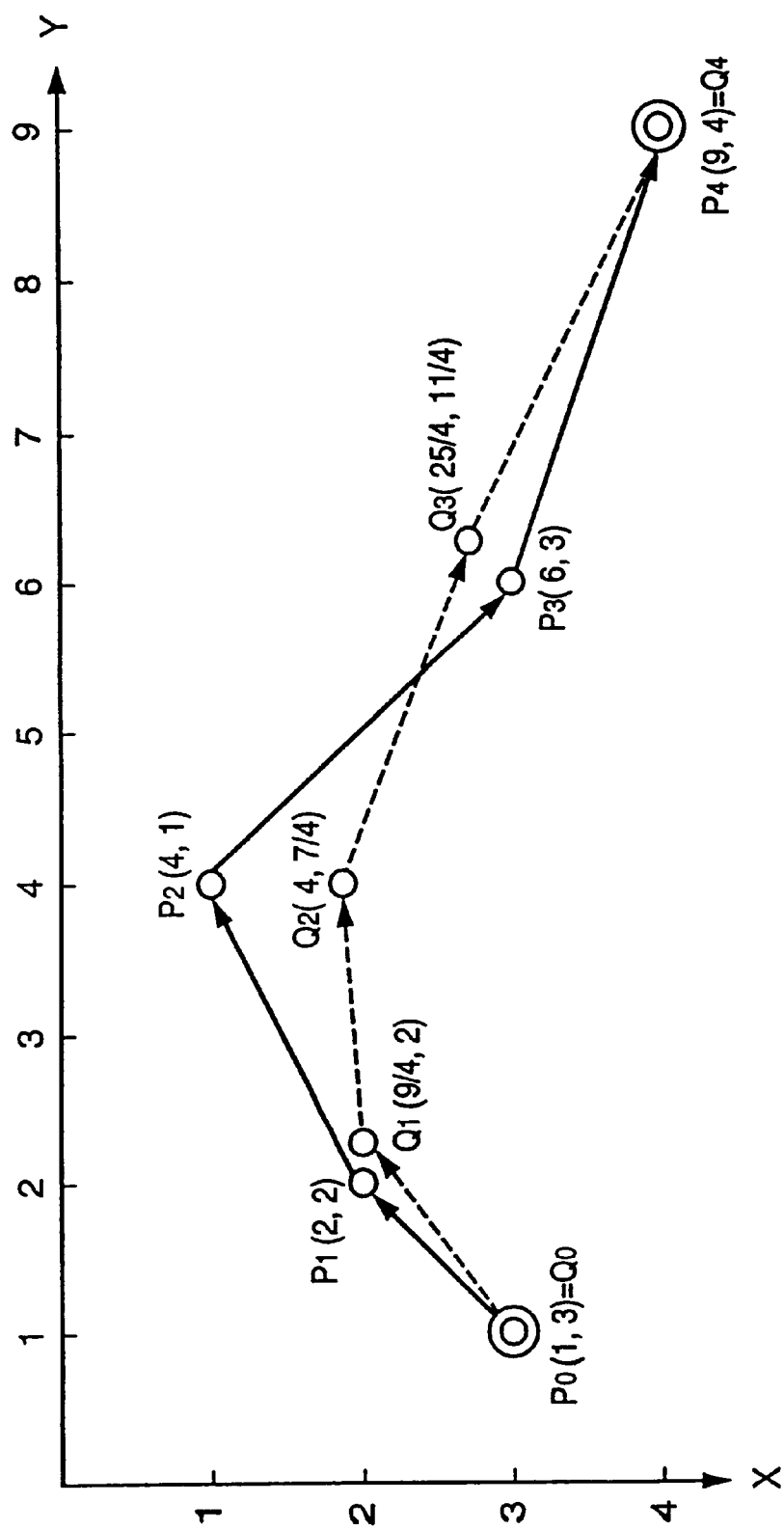
FIG. 19 is a diagram for describing an overview of the prior art.

It should be noted that the outline smoothing/zooming unit 13 can be implemented also by executing the procedure of FIG. 16 using the arrangement of FIG. 15, as described above in the section pertaining to the related art.

Figure 21:
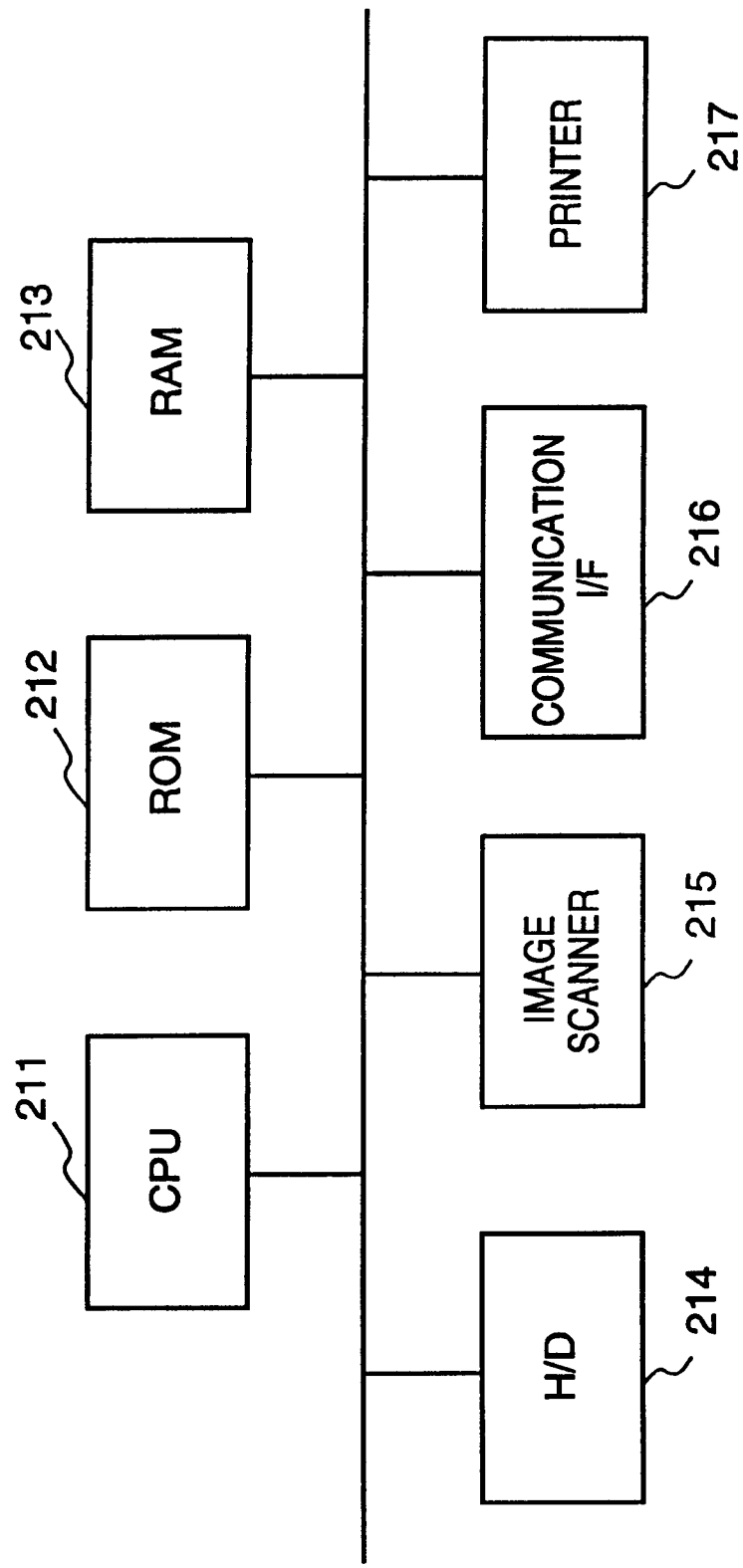
FIG. 21 is a block diagram in which the apparatus of FIG. 1 is realized by execution of a predetermined program using a processor.
Figure 22:
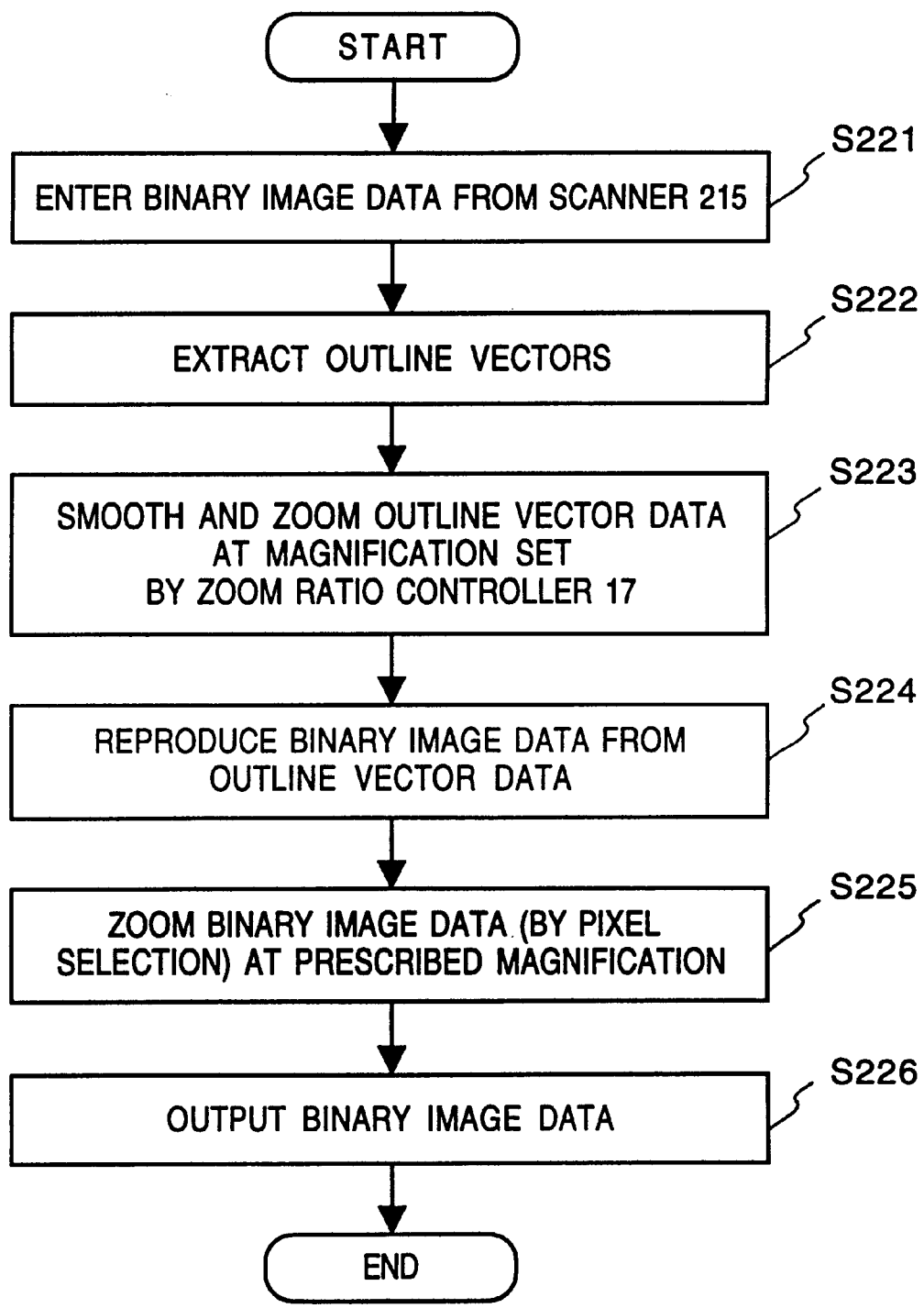
FIG. 22 is a flowchart of a procedure executed by the processor of FIG. 21.

Furthermore, the arrangement of FIG. 1 can be implemented also by executing a prescribed program using a processor. A set-up for achieving this is as shown in FIG. 21. Specifically, if the procedure shown in the flowchart of FIG. 22 is executed by a CPU 211, then the elements of FIG. 1 will be implemented by the steps of the flow chart. The procedure of FIG. 22 is stored as a program in a RAM 213 and a ROM 212.

First, at step S221 in FIG. 22, the binary image data is entered from a scanner 215. This input may be made via a communication I/F 216 or use may be made of data that has been stored on a hard disk 214. Next, at step S222, the outline vector data of the entered binary image is extracted. The zoom ratio controller 17 subjects the extracted outline vectors to smoothing/zooming processing (step S223) at a magnification set by the procedure of FIG. 20. The binary image is reproduced at step S224 based upon the outline vector data thus zoomed, and the reproduced binary image is zoomed at a prescribed zoom ratio, such as by a factor of two both vertically and horizontally, at step S225. Finally, the resulting binary image data is outputted from the communication I/F 216 or from a printer 217 at step S226. Thus, effects similar to those of FIG. 1 can be obtained.

<Second Embodiment>

In the first embodiment, the second zooming unit 16 is described in terms of the circuit shown in FIG. 2. However, this does not impose a limitation upon the present invention. Specifically, in FIG. 2, the circuit described performs multiplication by a factor of $$\frac{1}{2}$$

both vertically and horizontally. However, the frequency divider 501 or 502 may be replaced by a frequency divider having a frequency dividing ratio other than $$\frac{1}{2},$$

such as a frequency dividing ratio of $$\frac{1}{4}$$

or $$\frac{1}{8}.$$

In such case the zoom ratio controller 17 sets the magnification of the outline smoothing/zooming unit 13 in such a manner that the magnification finally desired is obtained based upon the magnification set in the outline smoothing/zooming unit 13 and the zoom ratio from the second zooming unit 16. This magnification generally should be set to a value which is a factor of the reciprocal of the frequency dividing ratio, namely to 4× if the second zooming unit 16 has a frequency dividing ratio of $$\frac{1}{4}$$

and to 8× if the second zooming unit 16 has a frequency dividing ratio of 8. Further, an arrangement may be adopted in which zooming is performed at different frequency dividing ratios in the main-scan (horizontal) and sub-scan (vertical) directions.

In comparison with the case where the frequency dividing ratio of the second zooming unit 16 is set to be $$\frac{1}{2},$$

setting the frequency dividing ratio to be $$\frac{1}{4}$$

makes it possible for the smoothing/zooming by the outline smoothing/zooming unit 13 to maintain a magnification of 2× or greater even if the overall zoom ratio is between $$\frac{1}{2},$$

and 1.

The outline smoothing/zooming unit 13 using the outline vector information described in the first embodiment basically employs a method based upon prior art ①. Consequently, at the time of a magnification of less than 2×, there is a possibility that a vector of zero length and indeterminate direction will occur.

Accordingly, in a case where the overall magnification is between 1× and 2× (low magnification), occurrence of a vector of zero length and indeterminate direction can be eliminated in the first embodiment. Further, when reduction is performed at a factor of $$\frac{1}{2}x \text{ to } 1x,$$

the occurrence of the above-mentioned vector cannot be suppressed completely but the suppression effect is superior to that of the prior art. In a case where the magnification by the second zooming unit is $$\frac{1}{4}x,$$

the occurrence of vectors of zero length can be eliminated even at the above-mentioned reduction ratio. In a case where the magnification by the second zooming unit is $$\frac{1}{8}x,$$

the occurrence of vectors of zero length and indeterminate direction can be eliminated even if the overall magnification is $$\frac{1}{4}x \sim \frac{1}{2}x.$$

In the zooming of an image for which the reading density in main scanning differs from that in sub-scanning, as when a facsimile machine is placed in a standard mode, setting the frequency dividing ratio of the second zooming unit to be different in the main-scan and sub-scan directions may be an optimum situation. In such case it would suffice to use frequency dividers having optimum frequency dividing ratios in the main-and sub-scan directions. The frequency dividers can be realized by well-known circuitry using flip-flops, counters, etc. When a counter is used, the timing at which a carry occurs can be changed by altering a preset value, thus making it possible to change the frequency dividing ratio.

Further, the second zooming unit 16 in the first and second embodiments both employ the SPC method described above in the discussion of the prior art. However, this does not impose a limitation upon the invention because the projection method or PRES method described in the prior art may also be used as a matter of course. In such case a higher image quality can be obtained than when the second zooming unit is constructed using the SPC method.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for enlarging or reducing an original image at a first ratio, said apparatus comprising:

extracting means for extracting contour vector data of an image from image data;

enlargement means for enlarging the contour vector data at a second ratio;

reproducing means for reproducing image data by filling a contour represented by the contour vector data enlarged by said enlargement means;

reduction means for reducing the image data reproduced by said reproduction means at a third ratio having a predetermined value; and determination means for determining the second ratio based upon the first and third ratios, so that the original image is effectively enlarged or reduced at the first ratio by the combination of enlarging the contour vector data at the second ratio and reducing the image data at the third ratio.

2. The apparatus according to claim 1, wherein the third ratio is ½, ¼ or ⅛.

3. The apparatus according to claim 2, wherein said reduction means reduces the image data by a thinning-out processing.

4. The apparatus according to claim 2, wherein said reduction means reduces the image data by a projection method.

5. The apparatus according to claim 2, wherein said reduction means reduces the image data by a PRES method.

6. The apparatus according to claim 1, further comprising output means for outputting the image data reduced by said reduction means as an image.

7. The apparatus according to claim 6, wherein said output means includes a printer for printing out the image.

8. The apparatus according to claim 6, wherein said output means includes a display for displaying the image.

9. The apparatus according to claim 6, wherein said output means includes a communication means for outputting the image data via communication.

10. The apparatus according to claim 6, wherein said output means includes encoding means for encoding the image data by a prescribed encoding method.

11. The apparatus according to claim 6, wherein said output means includes a printing device for printing out the binary image.

12. The apparatus according to claim 1, wherein said enlargement means includes smoothing means for smoothing the contour vector data.

13. The apparatus according to claim 1, wherein the image data extracted by said extracting means and reproduced by said reproducing means is dot image data.

14. An image processing method for enlarging or reducing an original image at a first ratio by enlarging the image at a second ratio and reducing the enlarged image at a third ratio having a predetermined value, said method comprising:

an extracting step of extracting contour vector data of an image from image data;

a determining step of determining the second ratio based upon the first and third ratios, so that the original image is effectively enlarged or reduced at the first ratio by the combination of enlarging the contour vector data at the second ratio and reducing image data reproduced from the enlarged contour vector data at the third ratio;

an enlarging step of enlarging the contour vector data extracted in said extracting step at the second ratio;

a reproducing step of reproducing image data by filling a contour represented by the contour vector data enlarged in said enlarging step; and a reduction step of reducing the image data reproduced in said reproducing step at the third ratio.

15. The method according to claim 14, wherein the third ratio is ½, ¼ or ⅛.

16. The method according to claim 15, wherein said reducing step reduces the image data by a selective processing conversion of pixels.

17. The method according to claim 15, wherein said reducing step reduces the image data by a projection method.

18. The method according to claim 15, wherein said reducing step reduces the image data by a PRES method.

19. The method according to claim 14, further comprising an output step of outputting the image data reduced at said reducing step as an image.

20. The method according to claim 19, wherein said output step includes a printing step of printing out the image.

21. The method according to claim 19, wherein said output step includes a display step of displaying the image.

22. The method according to claim 19, wherein said output step includes a communication step of outputting the image data via communication.

23. The method according to claim 19, wherein said output step includes an encoding step of encoding the image data by a prescribed encoding method.

24. The method according to claim 19, wherein said output step outputs the binary image by a printer for printing out the binary image.

25. The method according to claim 14, wherein said enlarging step includes a smoothing step of smoothing the contour vector data.

26. The method according to claim 14, wherein the image data extracted in said extracting step and reproduced in said reproducing step is dot image data.

27. A computer readable medium storing a program for enlarging or reducing an original image at a first ratio by enlarging the image at a second ratio and reducing the enlarged image at a third ratio having a predetermined value, said program comprising processing steps of:

extracting contour vector data of an image from image data;

determining the second ratio based upon the first and third ratios, so that the original image is effectively enlarged or reduced at the first ratio by the combination of enlarging the contour vector data at the second ratio and reducing image data reproduced from the enlarged contour vector data at the third ratio;

enlarging the contour vector data extracted in said extracting processing step at the second ratio;

reproducing image data by filling a contour represented by the contour vector data enlarged in said enlarging processing step; and reducing the image data reproduced in said reproducing processing step at the third ratio.

28. The medium according to claim 27, wherein the third ratio is ½, ¼ or ⅛.

29. The medium according to claim 27, wherein the image data extracted in said extracting processing step and reproduced in said reproducing processing step is dot image data.

* * * * *

UNITED STATES PATENT AND TRADEMARK OFFICE
CERTIFICATE OF CORRECTION

PATENT NO.   : 6,232,978 B1
DATED        : May 15, 2001
INVENTOR(S)  : Yoshihiro Ishida et al.

It is certified that error appears in the above-identified patent and that said Letters Patent is hereby corrected as shown below:

Title Page
Item [56], References Cited Under Other Publication
"vol." should read -- Vol. --.

Sheet 2,
Figure 2, "SYNCRONIZING" (both occurrences) should read -- SYNCHRONIZING --.

Column 4,
Line 48, "point, after second smoothing," should read -- point after second smoothing --.

Column 5,
Line 31, "the resulting" should read -- the result --.
Line 48, "so adapted: should read -- adapted so --.

Column 6,
Line 5, "½χ" should read -- ½x --.
Line 10, "¼χ" should read -- ¼x --.
Line 24, "obtain" should read -- obtained --.
Line 25, "hand" should read -- other hand, --.
Line 53, "whole-number" should read -- whole-numbers --.

Column 12,
Line 57, "one-half" should read -- one half --.

Column 13,

UNITED STATES PATENT AND TRADEMARK OFFICE
CERTIFICATE OF CORRECTION

PATENT NO. : 6,232,978 B1
DATED : May 15, 2001
INVENTOR(S) : Yoshihiro Ishida et al.

It is certified that error appears in the above-identified patent and that said Letters Patent is hereby corrected as shown below:

Column 16,
Line 5, "½χ to 1χ" should read -- ½x to 1X, --.
Line 13, "¼χ" should read -- ¼x, --.
Line 20, "⅛χ," should read -- ⅛x, --.
Line 27, "¼χ ~ ½χ." should read -- ¼ x ~ ½ x. --.

Signed and Sealed this

Fourth Day of December, 2001

*Attest:*

NICHOLAS P. GODICI
*Attesting Officer*  *Acting Director of the United States Patent and Trademark Office*